(12) United States Patent
Na et al.

(10) Patent No.: US 9,579,608 B2
(45) Date of Patent: Feb. 28, 2017

(54) COMPOSITE MEMBRANES AND METHODS OF PREPARATION THEREOF

(71) Applicant: GLOBALFOUNDRIES INC., Grand Cayman (KY)

(72) Inventors: Young-Hye Na, San Jose, CA (US); Ratnam Sooriyakumaran, San Jose, CA (US); Ankit Vora, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 175 days.

(21) Appl. No.: 14/675,316

(22) Filed: Mar. 31, 2015

(65) Prior Publication Data

US 2015/0202575 A1 Jul. 23, 2015

Related U.S. Application Data

(62) Division of application No. 13/053,138, filed on Mar. 21, 2011, now Pat. No. 9,022,227.

(51) Int. Cl.
| | |
|---|---|
| *B01D 71/56* | (2006.01) |
| *B01D 69/12* | (2006.01) |
| *B01D 61/02* | (2006.01) |
| *B01D 67/00* | (2006.01) |
| *C09D 5/16* | (2006.01) |

(Continued)

(52) U.S. Cl.
CPC ......... *B01D 67/0006* (2013.01); *B01D 69/12* (2013.01); *B01D 69/125* (2013.01); *B01D 71/56* (2013.01); *C09D 5/1637* (2013.01); *C09D 133/10* (2013.01); *C09D 133/12* (2013.01); *B01D 61/025* (2013.01); (Continued)

(58) Field of Classification Search
None
See application file for complete search history.

(56) References Cited

U.S. PATENT DOCUMENTS

| 4,039,440 A | 8/1977 | Cadotte |
| 4,277,344 A | 7/1981 | Cadotte |

(Continued)

FOREIGN PATENT DOCUMENTS

| EP | 0072002 A1 | 2/1983 |
| EP | 0419396 A1 | 3/1991 |

(Continued)

OTHER PUBLICATIONS

Adi Ben-David et al, "Facile surface modification of nanofiltration membranes to target the removal of endocrine-disrupting compounds", Journla of Membrane science, 357 (2010) 152-159.*

(Continued)

*Primary Examiner* — Krishnan S Menon
(74) *Attorney, Agent, or Firm* — Michael Le Strange; Hoffman Warnick LLC

(57) ABSTRACT

A polymeric membrane includes an active layer over a support, wherein the active layer includes at least two chemically distinct polyamide films. A first one of the films is in contact with the support, and a second one of the films is not in contact with the support. The second polyamide film is crosslinked with the first polyamide film at an interface therewith, and the second polyamide film includes a structure having a side chain group including an ammonium salt.

13 Claims, 8 Drawing Sheets

(51) Int. Cl.
　　*C09D 133/10*　　(2006.01)
　　*C09D 133/12*　　(2006.01)
(52) U.S. Cl.
　　CPC ...... *B01D 2323/30* (2013.01); *B01D 2323/40* (2013.01); *B01D 2325/48* (2013.01)

(56) References Cited

U.S. PATENT DOCUMENTS

| | | |
|---|---|---|
| 4,520,044 A | 5/1985 | Sundet |
| 4,554,317 A | 11/1985 | Behar et al. |
| 4,769,148 A | 9/1988 | Fibiger et al. |
| 4,897,091 A | 1/1990 | Pasternak et al. |
| 4,914,064 A | 4/1990 | Schucker |
| 4,931,483 A | 6/1990 | Matsuoka et al. |
| 5,019,264 A | 5/1991 | Arthur |
| 5,085,777 A | 2/1992 | Arthur |
| RE34,115 E | 10/1992 | Coplan et al. |
| 5,169,719 A | 12/1992 | Balatan |
| 5,547,575 A | 8/1996 | Demmer et al. |
| 5,578,688 A | 11/1996 | Ito et al. |
| 5,674,398 A | 10/1997 | Hirose et al. |
| 5,693,227 A | 12/1997 | Costa |
| 5,783,079 A | 7/1998 | Kumano et al. |
| 6,177,011 B1 | 1/2001 | Hachisuka et al. |
| 6,280,853 B1 | 8/2001 | Mickols |
| 6,346,588 B1 | 2/2002 | Fenchl et al. |
| 6,413,425 B1 | 7/2002 | Hachisuka et al. |
| 6,632,915 B1 | 10/2003 | Schwarte et al. |
| 6,821,430 B2 | 11/2004 | Andou et al. |
| 6,913,694 B2 | 7/2005 | Koo et al. |
| 7,490,725 B2 | 2/2009 | Pinnau et al. |
| 7,537,697 B2 | 5/2009 | Koo et al. |
| 7,585,927 B2 | 9/2009 | Liu |
| 7,629,434 B2 | 12/2009 | Saegusa et al. |
| 7,677,398 B2 | 3/2010 | Belfer et al. |
| 7,815,987 B2 | 10/2010 | Mickols et al. |
| 2003/0077435 A1 | 4/2003 | Charkoudian et al. |
| 2003/0121857 A1 | 7/2003 | Kurth et al. |
| 2003/0124357 A1 | 7/2003 | Kagerer et al. |
| 2003/0192828 A1 | 10/2003 | Fukutomi et al. |
| 2003/0226799 A1 | 12/2003 | Charkoudian |
| 2007/0251883 A1 | 11/2007 | Niu |
| 2008/0035571 A1 | 2/2008 | Sabottke et al. |
| 2008/0035572 A1 | 2/2008 | Sabottke et al. |
| 2008/0071056 A1 | 3/2008 | Borst |
| 2008/0149561 A1 | 6/2008 | Chu et al. |
| 2008/0181861 A1 | 7/2008 | Jiang et al. |
| 2008/0221298 A1 | 9/2008 | Yamanaka et al. |
| 2008/0234460 A1 | 9/2008 | Saegusa et al. |
| 2008/0269417 A1 | 10/2008 | Belfer et al. |
| 2008/0312349 A1 | 12/2008 | Yeager et al. |
| 2009/0156460 A1 | 6/2009 | Jiang et al. |
| 2009/0159527 A1 | 6/2009 | Mickols et al. |
| 2009/0162662 A1 | 6/2009 | Chang et al. |
| 2009/0197791 A1 | 8/2009 | Balastre et al. |
| 2009/0266764 A1 | 10/2009 | Kawakatsu |
| 2010/0006495 A1 | 1/2010 | Buschmann |
| 2010/0093874 A1 | 4/2010 | Monin et al. |
| 2010/0216899 A1 | 8/2010 | Allen et al. |
| 2012/0012527 A1 | 1/2012 | Allen et al. |
| 2012/0048799 A1 | 3/2012 | Na et al. |
| 2012/0241373 A1 | 9/2012 | Na et al. |
| 2013/0327714 A1 | 12/2013 | Alrasheed et al. |
| 2014/0217014 A1 | 8/2014 | Na et al. |
| 2014/0353253 A1 | 12/2014 | Allen et al. |

FOREIGN PATENT DOCUMENTS

| | | |
|---|---|---|
| IE | 19912781 A1 | 2/1992 |
| JP | S5824304 A | 2/1983 |
| JP | 05146655 | 6/1993 |
| JP | H071713601 A | 7/1995 |
| JP | H0810595 A | 1/1996 |
| JP | 3438278 | 8/2003 |
| JP | 2007171361 A | 7/2007 |
| WO | 9962623 | 12/1999 |
| WO | 2006041115 A1 | 4/2006 |
| WO | 2006070728 A1 | 7/2006 |

OTHER PUBLICATIONS

Belfer et al, "Surface modification of commercial composite reverse osmosis membranes", Journal of Membrane Science 139 (1998) 175-181.*

Final Office Action from U.S. Appl. No. 13/491,506, dated Sep. 25, 2015, 14 pp.

Machine translation of Japanese patent 07-171361, 7 pp.

Florian, et al., "Preparation and Characterization of Novel Solvent-Resistant Nanofiltration Composite Membranes Based on Cross-linked Polyurethanes," Ind. Eng. Chem. Res., 2007, 46(14), 4891-4899.

Nunes, et al., "Dense hydrophilic composite membranes for ultrafiltration", Journal of Membrane Science 106 (1995) 49-56.

Qiu, et al., "Preparation of Reverse Osmosis Composite Membrane with High Flux by Interfacial Polymerization of MPD and TMC," Journal of Applied Polymer Science,vol. 112, 2066-2072 (2009).

Sagle, et al., "PEG-coated reverse osmosis membranes: Desalination properties and fouling resistance", Journal of Membrane Science, 340, (2009), 92-108.

Sforca, et al., "Composite nanofiltration membranes prepared by in situ polycondensation of amines in a poly(ethylene oxide-b-amide) layer," Journal of Membrane Science 135 (1997) 179-186.

R.L. Riley et al., "Spiral-Wound Poly(Ether/Amide) Thin-Film Composite Membrane Systems", Desalination, 19 (1976) 113-126.

Karol J. Mysels et al., "Strength of Interfacial Polymerization Films", Langmuir 1991, 7, 3052-3053. 10.

Guodong Kang et al., "A novel method of surface modification on thin-film composite reverse osmosis membrane by grafting poly(ethylene glycol)", Polymer 48 (2007) 1165-1170.

Young-Hye La et al., "Novel thin film composite membrane containing ionizable hydrophobes: pH-dependent reverse osmosis behavior and improved chlorine resistance", J. Mater. Chem., 2010, 20, 4615-4620.

Robert J. Petersen, "Composite reverse osmosis and nanofiltration membranes", Journal of Membrane Science, 83 (1993) 81-150.

Li-Fen Liu et al., "Study on a novel polyamide-urea reverse osmosis composite membrane (ICIC-MPD) I. Preparation and characterization of ICIC-MPD membrane", Journal of Membrane Science 281 (2006) 88-94.

Meihong Liu et al., "Preparation, structure characteristics and separation properties of thin-film composite polyamideurethane seawater reverse osmosis membrane", Journal of Membrane Science, 325 (2008) 947-956.

Na et al., "Thin Film Composite (TFC) Polyamide Membranes Containing Hexafluoroalcohol (HFA) Functionality for Water Desalination", IBM Corporation 2010 (44 pages).

Prosecution History from U.S. Appl. No. 13/053,138 from Sep. 9, 2014 through Dec. 29, 2014 30 pp.

* cited by examiner

COMPOSITE MEMBRANES AND METHODS OF PREPARATION THEREOF

PRIORITY CLAIM

This application is a divisional of U.S. application Ser. No. 13/053,138, filed Mar. 21, 2011, the entire contents of which are incorporated herein by reference.

TECHNICAL FIELD

The present invention relates to membranes that can be used, for example, in water purification, desalination and gas separation processes. The membranes include an active layer with at least two chemically distinct polyamide films.

BACKGROUND

Thin film composite (TFC) membranes including ultrathin active layers and porous supports have been widely used in reverse osmosis (RO) or nanofiltration (NF) processes for desalination. The active layer in a TFC membrane controls separation properties, while the support layer enhances mechanical strength.

TFC membranes commonly experience substantial flux declines when exposed to feed water contaminants such as, for example, particulates or suspensions of organic, inorganic or biological materials. The contaminants can cause membrane fouling, which increases the operating pressure required for a constant rate of water production, decreases the service lifetime of the membrane, and increases operating costs. To reduce fouling, the feed water entering the membrane may be pre-treated, or the membrane may be periodically chemically cleaned to remove contaminant deposits. Although pretreatment processes can remove certain foulants such as large particles or biomolecules, dissolved organic matter can remain on the membrane following the pretreatment step.

The membrane surface may be modified by applying a protective coating layer to mitigate fouling, which can reduce the number of cleaning cycles. Anti-fouling coating layers have been made from, for example, nanoparticles, enzymes, and epoxy compounds. Although the above-described materials and techniques can reduce membrane fouling, generally they are not well-suited for large scale manufacturing because additional casting, drying and/or curing steps may be required to form the thin protective layers on a support membrane. In addition, depending on their thickness, these additional protective coating layers can cause a drop in water flux through the membrane.

Consequently, a continuing need exists for filtration membranes, particularly for water purification, having enhanced fouling resistance, anti-microbial properties, and/or enhanced salt rejection properties.

SUMMARY

In one aspect, the present disclosure is directed to a polymeric membrane including an active layer over a support, wherein the active layer includes at least two chemically distinct polyamide films. A first one of the films is in contact with the support, and a second one of the films is not in contact with the support. The second polyamide film is crosslinked with the first polyamide film at an interface therewith, and the second polyamide film includes a structure having a side chain group including an ammonium salt.

In another aspect, the present disclosure is directed to a composite membrane including an active layer over a support. A first sublayer in the active layer includes a crosslinked aromatic polyamide, wherein the first sublayer is adjacent the support. A second sublayer in the active layer is crosslinked at an interface with the first sublayer. The second sublayer includes at least one of: a crosslinked poly(meth)acrylate polymer having a side chain including an ammonium salt, and a crosslinked poly(meth)acrylamide polymer having a side chain including an ammonium salt.

In another aspect, the present disclosure is directed to a method of making a composite membrane using a sequential interfacial polymerization method. In this method a chemical mixture (A) is applied to a support membrane to form a treated support membrane. The chemical mixture (A) includes comprises an aqueous solution of a monomeric polyamine reactant represented by Formula 1:

$$R(NH_2)_z \quad \text{Formula 1}$$

wherein R represents an organic group selected from aliphatic, alicyclic, aromatic, heterocyclic groups and combinations thereof, and z represents an integer of 2 or more.

A chemical mixture (B) is applied to the treated support membrane to form a first active layer on the support membrane, wherein the chemical mixture (B) includes an organic solvent and a monomeric polyfunctional acyl halide reactant represented by Formula 2:

$$R^1\text{-(COX)}_p \quad \text{Formula 2}$$

wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

A chemical mixture (C) is applied to the first active layer. The chemical mixture (C) includes a crosslinkable hydrophilic polymer with a backbone having repeat units selected from at least one of (meth)acrylate and (meth)acrylamide, and wherein at least one of the repeat units includes a side chain having an ammonium salt and a nucleophilic amine group capable of interfacially reacting with an acid halide on or bonded to the first active layer to form a second active layer on the first active layer.

The protective layers in the composite membrane can include chemical moieties selected to enhance its antifouling and/or antimicrobial properties. In addition to providing antifouling properties, the protective layers in the composite membranes of this disclosure are preferably ultrathin (for example, less than about 20 nm) to minimize flux drop and preserve membrane performance. In addition, the protective layers preferably do not delaminate from underlying layers during extended periods of membrane operation.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a plot of water permeate flux as a function of operation time for an oil/water emulsion cross-flow filtration tested with the P-1-modified RO (I) and an unmodified RO membrane, Ref-PA-1.

FIG. 5 is a plot of permeate flux vs. time for an oil/water emulsion cross-flow filtration tested with the P-1-modified RO (II) and an unmodified RO membrane, Ref-PA-2.

FIG. 6 is a plot of permeate flux vs. time for an oil/water emulsion cross-flow filtration tested with the P-2-modified RO (I) and an unmodified RO membrane, Ref-PA-3.

FIG. 7 is a plot of permeate flux vs. time for an oil/water emulsion cross-flow filtration tested with the P-2-modified RO (II) and an unmodified RO membrane, REF-PA-4.

FIG. 8 is a plot of permeate flux vs. time for an oil/water emulsion cross-flow filtration tested with the P-3-modified RO and an unmodified RO membrane, REF-PA-5.

In the drawings, like symbols indicate like elements.

DETAILED DESCRIPTION

Figure 1:
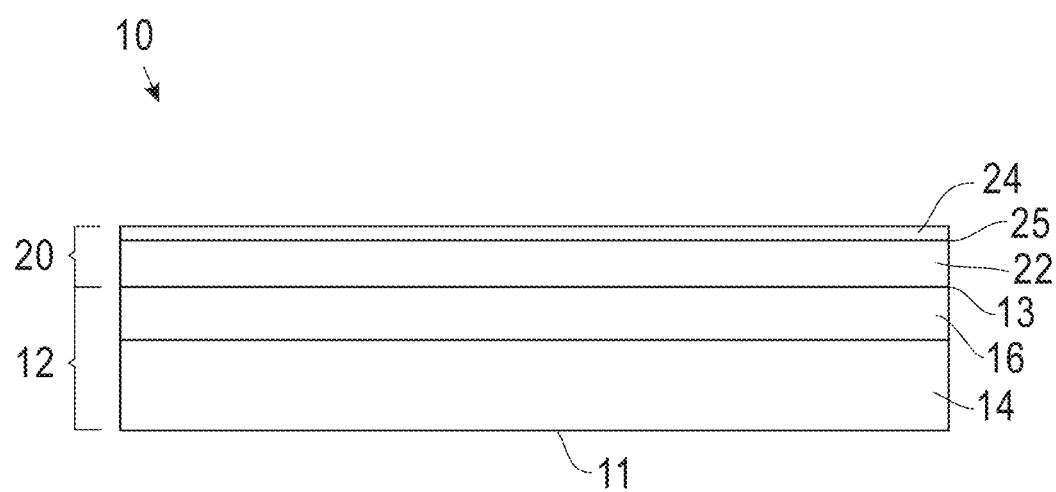
FIG. 1 is a schematic cross-sectional layer diagram of an embodiment of a TFC filtration membrane.

FIG. 1 illustrates a TFC filtration membrane 10 including a support 12 having a first surface 11 and a second surface 13. The support 12 provides structural integrity for the TFC filtration membrane 10. The support 12 may include a wide variety of porous layers, and is not limited to the construction shown in FIG. 1.

In the embodiment shown in FIG. 1, the support 12 includes a support web 14 of a flexible, porous, organic polymeric material that can be fibrous in nature if desired. An example of a fibrous backup or support material 14 is a paper-like web of spun-bonded polymeric (e.g., polyethylene) fibers having diameters in the micrometer range.

A porous support membrane 16 resides on the support web 14. The porous support membrane 16 may vary widely depending on the intended application of the TFC composite membrane 10. In one embodiment, the porous support membrane 16 is an ultrafiltration membrane that can be used to support RO/NF membranes made with an interfacial polymerization process. The porous support membrane can be flexible or rigid, and can include an organic material, inorganic material, a metal material, or a combination of the foregoing materials. Exemplary organic materials for porous support membranes include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd), polycarbonates (e.g., those sold under the trade designation NUCLEPORE by Whatman Ltd), poly(vinylidene difluoride), polypropylenes, Nylon 6,6, poly(tetrafluoroethylene)s (e.g., those sold under the trade names PORO-TEX and PARA-TEL by DeWAL Industries), and combinations of the foregoing materials. Exemplary inorganic materials for porous support membranes include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals for porous support membranes include for example nickel, nickel alloys, and stainless steel.

The porous support membrane has an average pore diameter of about 1 to about 1000 nm, about 1 to 100 nm (0.1 micrometer), about 1 to 10 nm, about 2 to about 8 nm, and even more particularly about 3 to about 6 nm. In this application the term "pores" refers to regular and irregular voids and/or channels extending from one face to an opposite face of the porous support membrane. Microfiltration (MF) support membranes have an average pore size of about 0.1 micrometers and a molecular weight cutoff of about 500,000 Daltons. Ultrafiltration (UF) support membranes have an average pore size of about 0.01 micrometers to about 0.1 micrometers and a molecular weight cutoff of about 1,000 Daltons to 500,000 Daltons. Nanofiltratoin (NF) support membranes have an average pore size of about 0.001 micrometers to about 0.01 micrometers and a molecular weight cutoff of about 100 Daltons to about 1000 Daltons. Reverse Osmosis (RO) support membranes have an average pore size of about 0.001 micrometers or less and a molecular weight cutoff of less than about 100 Daltons. The pore size of poly(sulfone) (PSF) ultrafiltration support membrane used in the examples below is about 1 to about 10 nm.

The porous support membrane can have a thickness of 1 micrometer to 10 millimeters, more particularly 1 micrometer to 100 micrometers, more particularly 1 micrometer to 80 micrometers, and even more particularly 1 micrometer to 50 micrometers.

Referring again to FIG. 1, an active layer 20 resides on the surface 13 of the support 12. The active layer 20 includes at least two chemically distinct sublayers 22 and 24, which are crosslinked at their interface 25. The sublayers 22, 24 are polyamide films that can be readily made using sequential interfacial polymerization steps. In this application interfacial polymerization refers to polymerization reaction(s) that occur at or near the interfacial boundary of two immiscible solutions.

The active layer 20 includes at least a separation layer 22 and a protective layer 24. In some embodiments, the separation layer 22 is a crosslinked polyamide, preferably a crosslinked aromatic polyamide. The protective layer 24 includes a crosslinked structure having a side chain group including an ammonium salt, and the structure may optionally include at least one hydrophilic side chain group. In another embodiment, the protective layer 24 is derived from a polymer including a side chain with a nucleophilic amine group.

The crosslinked polyamide polymer making up the protective layer 24 includes a backbone with one or more repeat units, wherein at least one of the repeat units includes a side chain group having an ammonium salt. The side chain group with the ammonium salt may be selected from, for example, (a) cationic side chain groups, each of the cationic side chain groups having a net positive charge; (b) zwitterionic side chain groups, each of the zwitterionic side chain groups having a net zero charge; and, (c) combinations of (a) and (b). The side chain group with the ammonium salt may optionally include a poly(alkylene oxide) group.

In an embodiment, the crosslinked polymer in the protective layer 24 includes at least one of: (1) a crosslinked poly(meth)acrylate polymer having a side chain group with an ammonium salt and an optional poly(alkylene oxide) side chain group; and, (2) a poly(meth)acrylamide polymer having a side chain group with an ammonium salt and an optional poly(alkylene oxide) side chain group.

Figure 2:
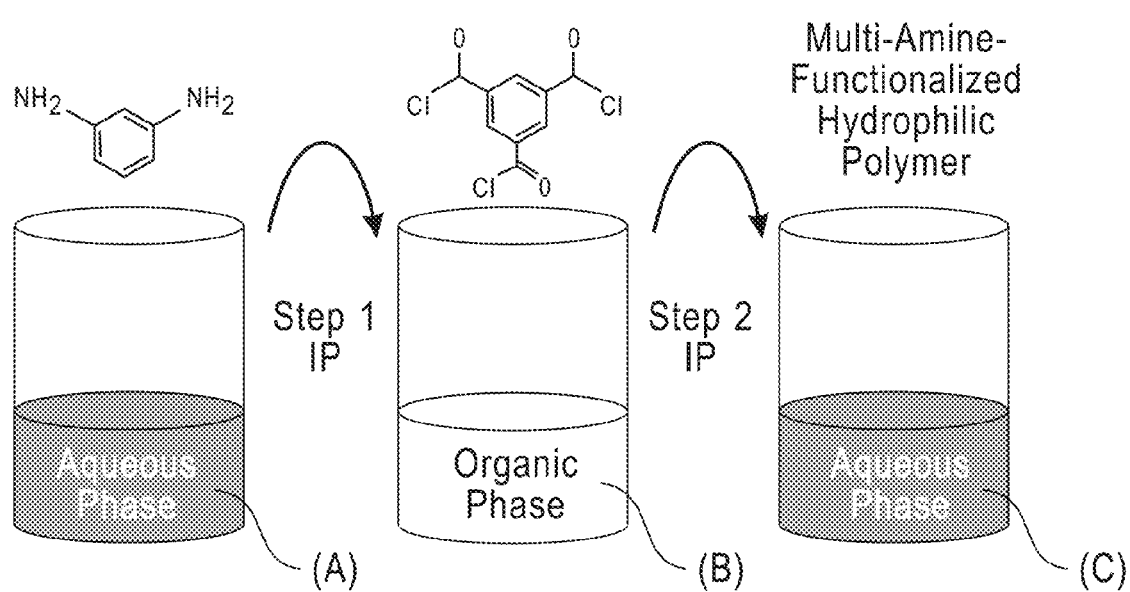
FIG. 2 is a schematic representation of an embodiment of a sequential interfacial polymerization procedure that may be used to fabricate the polyamide TFC membranes described in this disclosure.

FIG. 2 is a schematic representation of a sequence of interfacial polymerization (IP) reactions that may be used to form the active layers 22, 24 of the TCF membrane 10. However, FIG. 2 represents only an example, and the present invention is not limited to this specific procedure or order of operations.

In the embodiment shown in FIG. 2, the first separation layer 22 of the TFC membrane 10 is derived from an interfacial polymerization (IP) reaction (referred to herein as Step I IP) between an aqueous chemical mixture (A) and an organic chemical mixture (B) on the support layer 16 (FIG. 1). The aqueous chemical mixture (A) and the organic chemical mixture (B) are immiscible. When the mixtures (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

The aqueous chemical mixture (A) includes a monomeric polyamine reactant represented by Formula 1:

Formula 1 wherein R in Formula 1 represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments of the compounds of Formula 1, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admanthane rings, norbornane rings and combinations thereof. In some embodiments, R in Formula 1 is a benzene ring, and z is equal to 2.

A base can be optionally added to aqueous solution (A) to improve the solubility of the monomeric polyamine reactants. The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

The organic chemical mixture (B) in interfacial polymerization Step 1 IP includes a monomeric polyfunctional acyl halide reactant, represented by Formula 2:

Formula 2 wherein $R^1$ in Formula 2 represents an organic group selected from aliphatic alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, $R^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, $R^1$ can include an organic group selected from benzene rings, naphthalene rings, cyclohexane rings, admanthane rings, norbornane rings and combinations thereof.

In some embodiments, $R^1$ in the polyfunctional acyl halide reactant of Formula 2 represents an organic group represented by Formula 3:

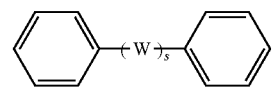

Formula 3 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in solution (B) includes at least one of a divalent organic compound represented by Formula 4 or a trivalent organic compound represented by Formula 5:

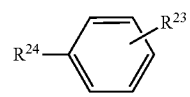

Formula 4

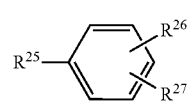

Formula 5 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acyl halide reactant in solution (B) includes at least one of a compound selected from a trivalent organic compound represented by Formula 6 or a divalent organic compound represented by Formula 7:

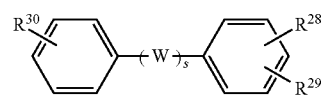

Formula 6

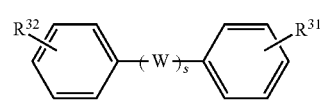

Formula 7 wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from CH$_2$, O, S, C=O, SO$_2$, C(CH$_3$)$_2$, C(CF$_3$)$_2$ and combinations thereof, and wherein s represents an integer of 0 or 1.

In other embodiments, the monomeric polyfunctional acyl halide reactant in solution (B) includes a compound selected from any of the compounds in Formulas 37 through 61, and combinations thereof:

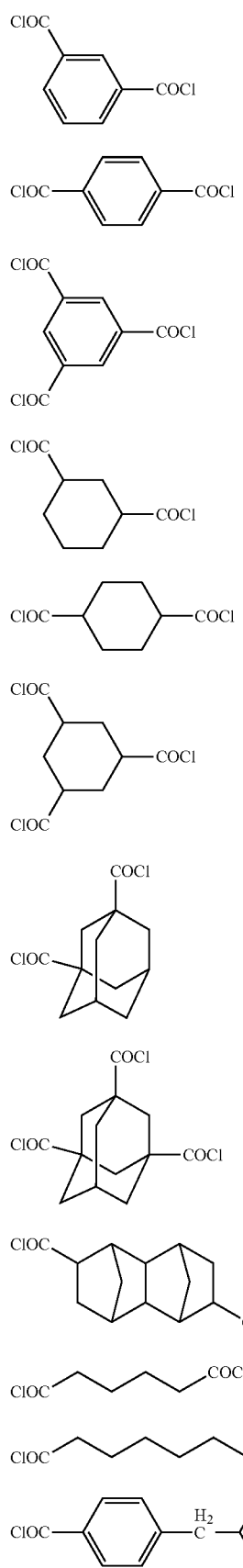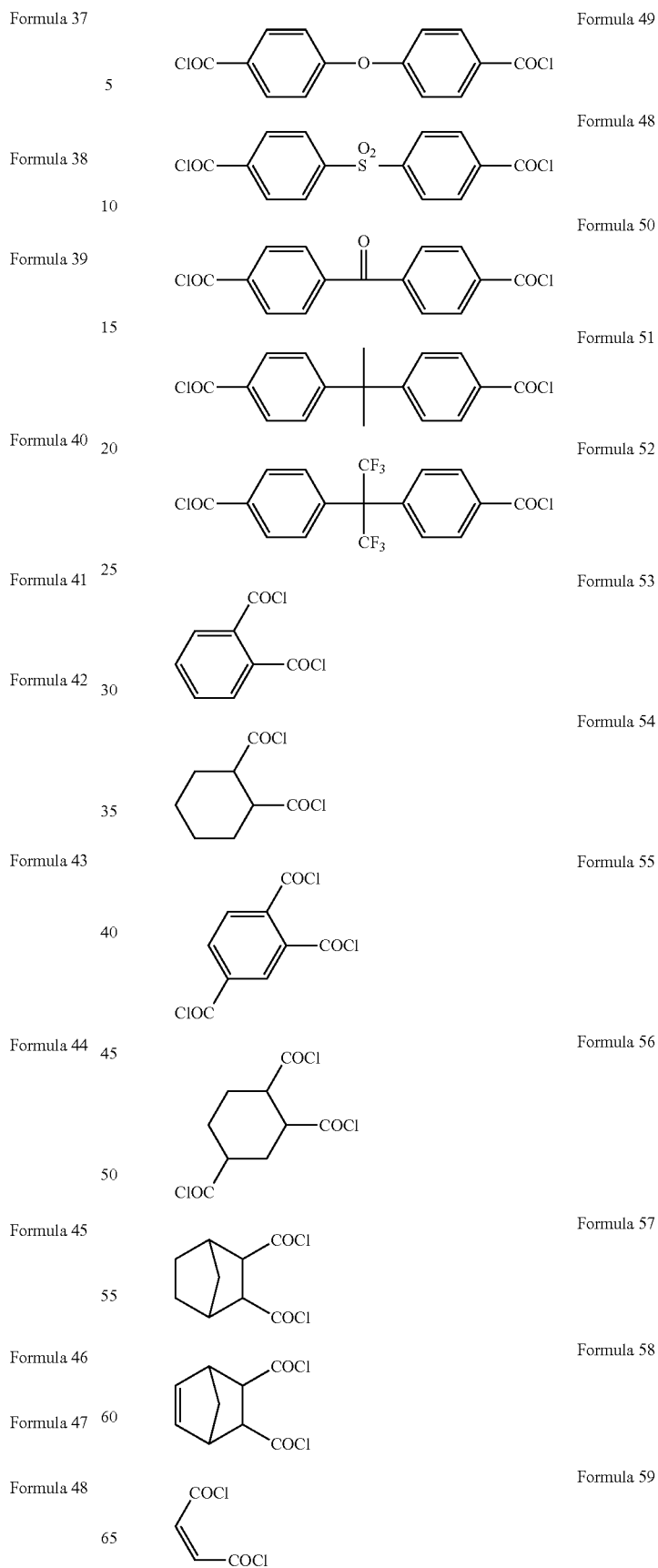

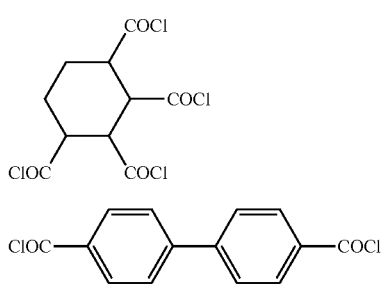

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to solution (A) and/or (B) to enhance reactivity or to improve membrane performance.

The concentration of the monomeric polyamine reactants in the aqueous solution (A) or the acyl halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric reactants are selected to provide a crosslinked polymeric reaction product that is referred to herein generally as a crosslinked polyamide. For example, diamine monomers will always make a crosslinked polyamide by reacting with trimesoyl chloride (TMC). After the interfacially polymerized, crosslinked aromatic polyamide has been formed, its crosslink density can be further increased by post-polymerization reactions with crosslinking or molecular weight-increasing agents such as methane sulfonyl halides, epihalohydrins, trimethylamine-sulfur trioxide complex, formaldehyde, glyoxal, and the like.

The ultrathin hydrophilic protective layer 24 is formed in a second interfacial polymerization step (referred to herein as Step 2 IP) on the polyamide layer 22 by applying to the layer 22 an aqueous, basic chemical mixture (C) including a crosslinkable polyamide polymer with a nucleophilic side chain group capable of entering into an interfacial reaction to form a chemical bond with the surface of the polyamide layer 22. Like the chemical mixtures (A) and (B) above, the chemical mixture (C) can be a solution, a dispersion, or a combination thereof, and is preferably a solution.

Referring again to FIGS. 1-2, in a preferred embodiment the crosslinked polyamide layer 22 formed on the support 12 by the reaction between solution (A) and solution (B) includes, residing on or near its surface, or chemically bound to its surface, unreacted acid halide groups that did not react with amines in the solution (A) during the initial interfacial polymerization reaction step (Step 1 IP). The term "acid halide" includes, for example, carboxylic acid halides, sulfonyl halides, sulfinyl halides, and functional groups including one or more phosphorous-halide bonds that can react with an amine to form a phosphorous-nitrogen bond. Linking groups formed by the reaction of a primary or secondary alkyl or aryl amine with any of the above acid halides include carboxy amides (i.e., —C(═O)N(R')(R")—), sulfonamides (i.e., —S(═O)2N(R')(R")—), sulfinamides (i.e., —S(═O)N(R')(R")—), and functional groups comprising a phosphorous-nitrogen bond, where —R' or —R" can be a monovalent hydrogen or a carbon bearing substituent. Herein, carboxy amides are also referred to simply as amides.

These unreacted acid halides on or bound to the surface of the layer 22 can eventually hydrolyze to carboxylic acid groups as normally observed at the surface of reverse osmosis (RO) membranes. However, this hydrolysis reaction is relatively slow, and in some embodiments of the present invention, the ultrathin hydrophilic protective layer 24 is formed (Step 2 IP) on the polyamide layer 22 by reacting the unreacted acid halides on or bound to the layer 22 with the crosslinkable polyamide polymer in aqueous basic chemical mixture (C) with the free acid halides bound to or remaining on the surface of the polyamide layer 22.

At least some of the monomeric repeat units in the crosslinkable polyamide polymer in chemical mixture (C) have a side chain group with an ammonium salt. In one embodiment, the crosslinkable polyamide polymer includes a backbone with (meth)acrylate and/or (meth)acrylamide monomeric repeat units, and at least one of the repeat units includes a side chain group with an ammonium salt.

The reaction product of Step 2 IP in FIG. 2, the protective layer 24, is a crosslinked polyamide film that is crosslinked at the interface 25 with the polyamide layer 22. Since there are normally a limited number of acid chloride molecules on or bound to the surface of the polyamide layer 22 following Step 1 IP that are available for further reaction, the hydrophilic protective layer 24 formed by the sequential interfacial polymerization Step 2 IP is ultrathin, and in some embodiments consists of a single hydrophilic poly(meth)acrylate and/or poly(meth)acrylamide polymer chain on the surface of the polyamide layer 22. Covalent links at multiple points on the polyamide layer 22 ensure that the protective layer 24 remains firmly bound to the polyamide layer 22 during extended periods of operation of the TFC membrane 10. The ultrathin hydrophilic protective layer 24 repels organic and/or biofoulants and inhibits cell-initiated biofilm growth.

The crosslinkable polyamide polymer in the aqueous chemical mixture (C) is water-compatible, which means soluble in water or suitably dispersible in water. The crosslinkable polyamide polymer is also preferably substantially insoluble in the solvent used to dissolve the acid halide compounds utilized in Step 1 IP above. In some embodiments, the crosslinkable polyamide polymer forms a clear solution in water at the concentration used to deposit the crosslinkable polyamide polymer on the polyamide layer 22.

The crosslinkable polyamide polymer includes a monomeric repeat unit having a side chain group with an ammonium salt. In one embodiment, the crosslinkable polyamide polymer includes a backbone with (meth)acrylate and/or (meth)acrylamide monomeric repeat units, and at least one repeat unit includes a side chain group with an ammonium salt. The term "(meth)acrylate" refers to an acrylate or a methacrylate monomer, while the term "(meth)acrylamide" refers to an acrylamide or a methacrylamide monomer. The term "poly(meth)acrylate" refers to a polymer in which the majority of the repeat units are derived from one or more acrylate monomers, one or more methacrylate monomers, or combinations thereof. The term "poly(acrylate)" refers to a polymer in which the majority of the repeat units are derived from one or more acrylate monomers. The term "poly(meth)

acrylate" refers to a polymer wherein the majority of the repeat units are derived from one or more methacrylate monomers. The term "poly(meth)acrylamide" refers to a polymer wherein the majority of the repeat units are derived from one or more acrylamide monomers, one or more methacrylamide monomers, or combinations thereof.

The crosslinkable poly(meth)acrylate and/or poly(meth)acrylamide polymer can be a random copolymer or a block copolymer. The block copolymer can include a block with a homopolymer chain segment or a random copolymer chain segment. In some embodiments, the number average molecular weight Mn of the crosslinkable polymer can be 1000 to 1,000,000 g/mol, more particularly 1000 to 100,000 g/mol, and even more particularly 1000 to 50,000 g/mole.

The crosslinkable polyamide polymer in aqueous mixture (C) includes a repeat unit including a side chain group with an ammonium salt, and the ammonium salt may be selected from, for example, cationic side chain groups that have a net positive charge and/or zwitterionic side chain groups that have a net zero charge, and combinations thereof. In some embodiments, the side chain groups on the crosslinkable polyamide polymer may include (a) hydrophilic poly(alkylene oxide) side chain groups, (b) amide side chain groups, wherein the crosslinkable polymer has thermoreversible properties in water, and (c) combinations thereof.

A cationic side chain is a side chain having a net positive charge based on charged groups covalently bound to the side chain. The net positive charge does not include negative counterions which are not covalently bound to the side chain, such as a halide counterion to a quaternary ammonium group. As an example, a (meth)acrylate repeat unit derived from the monomer diethyl aminoethyl methacrylate methyl iodide salt has a cationic side chain comprising a quaternary ammonium group.

A zwitterionic side chain is a dipolar side chain including a cationic group and an anionic group. The zwitterionic side chain has a net zero charge based on the charged groups that are covalently bound to the side chain. The net zero charge does not include negative or positive counterions which are not covalently bound to the side chain. As an example, a (meth)acrylate repeat unit derived from the monomer sulfobetaine methacrylate has a zwitterionic side chain comprising a quaternary ammonium group and a sulfonate ($SO_3^-$) group.

The crosslinkable polyamide polymer can further optionally include one or more repeat units derived from a non-crosslinking hydrophobic vinyl monomer. Further, the term "quaternary ammonium" includes non-cyclic quaternary nitrogens (e.g., tetralkyl ammonium salts) and cyclic quaternary nitrogens (e.g., quaternized pyridine group, quaternized imidazole group, quaternized piperidine group, and the like).

Several particular embodiments of the crosslinkable polymer composition follow.

In one embodiment, the crosslinkable polyamide polymer includes: i) a repeat unit having an ammonium salt; (ii) a repeat unit with an ester side chain moiety having a nucleophilic amine group capable of reacting with an acid halide, (iii) a repeat unit including an ester side chain moiety with a poly(alkylene oxide) chain, and (iv) a repeat unit including an ester side chain moiety with a zwitterionic group, wherein the zwitterionic group has a net zero charge.

In a second embodiment, the crosslinkable polymer includes (i) a repeat unit having an ammonium salt; (ii) a repeat unit comprising an ester side chain moiety comprising a nucleophilic amine group capable of reacting with an acid halide, (iii) a repeat unit including an ester side chain moiety comprising a poly(alkylene oxide) chain, and (iv) a repeat unit comprising an ester side chain moiety comprising a cationic group selected from the group consisting of quaternary ammonium, sulfonium groups, phosphonium groups, and combinations thereof, wherein the cationic group has a net positive charge.

In a third embodiment, the crosslinkable polymer includes (i) a repeat unit having an ammonium salt; (ii) a repeat unit including an ester side chain moiety comprising a nucleophilic amine group capable of reacting with an acid halide, and (iii) a repeat unit comprising an amide side chain moiety, wherein the crosslinkable polymer has a lower critical solution temperature (LCST) or upper critical solution temperature transition (UCST) in water at a temperature of 0° C. to 100° C., at a pH of 5 to 7, and at a concentration of more than 0 wt. % and less than or equal to 20 wt. % based on total weight of the solution. A crosslinkable polymer possessing an LCST or UCST in water is referred to herein as a thermoreversible crosslinkable polymer. The LCST or UCST can vary depending on the structure of the crosslinkable polymer. As a non-limiting example, an aqueous mixture of a thermoreversible crosslinkable polymer can have the form a gel at a temperature below 20° C., which reversibly collapses to a low viscosity dispersion at a temperature above 20° C. In another non-limiting example, a thermoreversible crosslinkable polymer can have a bell-shaped viscosity curve that peaks in viscosity at a temperature of, for example, 50° C., that collapses to a low viscosity dispersion or solution at either lower or higher temperatures. The LCST or UCST transition (e.g., the temperature range at which a rapid reversible change in viscosity is observed) can occur at any temperature in the range of 0° C. to 100° C. by tuning the polymer composition. The second repeat unit has an amide side chain moiety in which the amide nitrogen comprises one or more hydrocarbon substituents selected from the group consisting of methyl, ethyl, n-propyl, iso-propyl, cyclopropyl, n-butyl, sec-butyl, t-butyl, and combinations thereof.

The nucleophilic amine groups of the crosslinkable polyamide polymer can be primary amines, secondary amines, a mixture thereof, or a hydrogen salt form of any of these amines. The poly(alkylene oxide) side chain group can also include a nucleophilic amine group capable of undergoing an interfacial crosslink reaction with the an acid halide.

Repeat units of the crosslinkable polyamide polymer that include a side chain nucleophilic amine group have the general Formula 8 below:

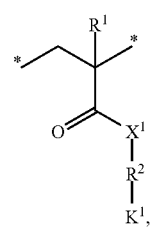

Formula 8 wherein, in Formula 8,
—$R^1$ is a hydrogen or a methyl group;
—$R^2$— is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms; and —$K^1$ is a monovalent radical selected from the group consisting of —$NH_2$ and —N(H)($R^4$), wherein —$K^1$ is capable of undergoing an interfacial reaction with an acid halide and —$R^4$ is a monovalent radical comprising 1 to 50 carbon atoms.

In an embodiment of the repeat unit of Formula 8, —$X^1$— is —O—, and the repeat unit is derived from a (meth) acrylate monomer of general formula 9:

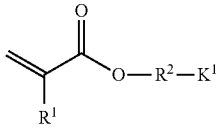

Formula 9 wherein —R', —$R^2$—, and —$K^1$ are defined as in Formula 8 above.

Exemplary (meth)acrylate monomers of general Formula 9 include 2-aminoethyl methacrylate (AEMA), 3-amino-1-propyl(meth)acrylate, 5-amino-1-pentyl(meth)acrylate, 6-amino-1-hexyl(meth)acrylate, 11-amino-1-undecyl(meth) acrylate, hydrogen salt forms of any of the foregoing second (meth)acrylate monomers, such as 2-aminoethyl methacrylate hydrochloride (AEMA-HCL), and combinations of the foregoing materials.

Repeat units of the crosslinkable polymer that include a hydrophilic poly(alkylene oxide) side chain are represented by the general Formula 10:

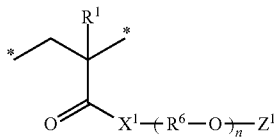

Formula 10 wherein, in Formula 10, n is a positive integer greater than 1;

—$R^1$ is a hydrogen or a methyl group;

—$X^1$— is a divalent radical selected from the group consisting of —O—, —N(H)—, and —N($R^5$)—, wherein —$R^5$ is a monovalent hydrocarbon radical comprising 1 to 20 carbon atoms;

—$R^6$— is a divalent radical selected from the group consisting of a ethylene, 2-propylene, butylene, and combinations thereof;

—$Z^1$ is a monovalent radical selected from the group consisting of —H, —$R^7$, -$L^1$-$NH_2$, -$L^1$-N(H)$R^7$, -$L^1$-N($R^7$)$_2$, and hydrogen salt forms of any of the foregoing amine groups, wherein —$R^7$ is a monovalent hydrocarbon radical comprising 1 to 20 carbon atoms, and -$L^1$- is a divalent radical comprising 1 to 20 carbon atoms.

In an embodiment of the repeat unit of Formula 10, each —$X^1$— is —O—, and repeat units comprising a hydrophilic poly(alkylene oxide) side chain group are derived from one or more (meth)acrylate monomers of general Formula 11:

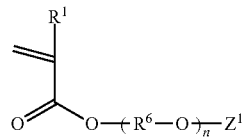

Formula 11 wherein

—R', —$R^6$—, n, and —$Z^1$ are defined as above. In an embodiment, —$Z^1$ is a methyl or ethyl group.

The poly(ethylene oxide) chain segment can be a poly (propylene oxide) chain segment, poly(butylene oxide) chain segment, or a combination thereof (e.g., a poly(ethylene oxide-co-propylene oxide) copolymer chain segment). The co-poly(alkylene oxide) chain segment can be a block copolymer or a random copolymer. As indicated above in the definition of —$Z^1$, the terminal end group of the poly (alkylene oxide) chain segment can comprise a nucleophilic amine group capable of an interfacial reaction with the multi-functional acid halide crosslinking agent. Alternatively, the end group of the poly(alkylene oxide) chain segment can be end capped so as to be non-reactive in the interfacial reaction. Non-limiting examples of poly(ethylene glycol) end capped methacrylate monomers include poly (ethylene glycol) methyl ether methacrylate (MPEGMA), poly(ethylene glycol) ethyl ether methacrylate (EPEGMA), and poly(propylene glycol) methyl ether methacrylate (PPGMA), Table 1.

TABLE 1

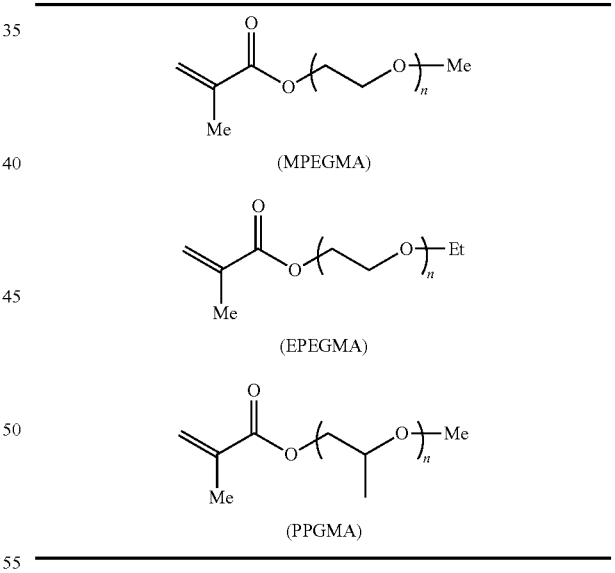

The poly(alkylene oxide) chain segment comprises at least two alkylene oxide repeat units, more particularly 3 to 100 alkylene oxide repeat units (i.e., n is a positive integer of 3 to 100 in Formula 10). In an embodiment, the poly (alkylene oxide) chain segment is a poly(ethylene oxide) chain segment (i.e., —$R^6$— is ethylene (—$CH_2CH_2$—)), and n is a positive integer of 5 to 15.

Cationic repeat units of the crosslinkable polymer and the crosslinked polymer can include a cationic side chain group and have a net positive charge. Cationic repeat units have the general Formula 12:

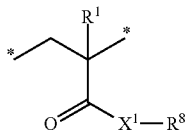

Formula 12 wherein, in Formula 12,
—$R^1$ is a hydrogen or a methyl group;
—$X^1$— is a divalent radical selected from the group consisting of —O—, —N(H)—, and —N($R^5$)—, wherein —$R^5$ is a monovalent hydrocarbon radical comprising 1 to 20 carbon atoms; and
—$R^8$ is a monovalent radical comprising a cationic group selected from the group consisting of quaternary ammonium groups, sulfonium groups, phosphonium groups, and combinations thereof. In an embodiment, the cationic group comprises a non-cyclic quaternary ammmonium group, and —$R^8$ has a net positive charge.

In an embodiment of the repeat unit of Formula 12, —$X^1$— is —N(H)— or —N($R^5$)— and the cationic repeat unit is derived from a cationic (meth)acrylamide. Exemplary cationic (meth)acrylamides include methacrylamido ethyl trimethyl ammonium chloride and methacrylamido propyl trimethyl ammonium chloride.

In another embodiment of the repeat unit of Formula 12, —$X^1$— is —O—, and the cationic repeat units are derived from one or more cationic (meth)acrylate monomers of general Formula 13:

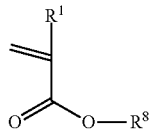

Formula 13 wherein —$R^1$ and —$R^8$ are defined as in Formula 12 above.

Exemplary cationic (meth)acrylate monomers include but are not limited to acryloxy ethyl dimethylbenzyl ammonium chloride and acryloxy ethyl trimethyl ammonium chloride sold under the tradenames NORSOCRYL by Arkema Inc. of France, 2-methacryloyloxy ethyl trimethyl ammonium chloride sold under the tradename MADQUAT Q6 by Norsolac, Inc., Sedalia, Mo., and 2-methacryloyloxy propyl trimethyl ammonium chloride.

An even more specific cationic (meth)acrylate monomer is diethyl aminoethyl methacrylate methyl iodide salt (DMEAMA-MI):

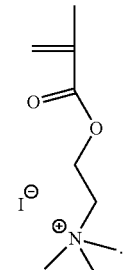

(DMEAMA-MI)

Zwitterionic repeat units of the crosslinkable polyamide polymer and the crosslinked polyamide polymer are dipolar side chain groups which have a net zero charge. Zwitterionic repeat units have the general Formula 14:

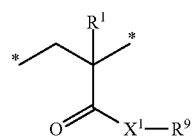

Formula 14 wherein, in Formula 14,
—$R^1$ is a hydrogen or a methyl group;
—$X^1$— is a divalent radical selected from the group consisting of —O—, —N(H)—, and —N($R^5$)—, wherein —$R^5$ is a monovalent radical comprising 1 to 10 carbon atoms; and
—$R^9$ is a zwitterionic monovalent radical comprising i) a cationic group selected from the group consisting of quaternary ammonium groups, sulfonium groups, phosphonium groups, and combinations thereof, and ii) an anionic group selected from the group consisting of carboxylate (—$CO_2^-$), sulfonate (—$SO_3^-$), sulfinate (—$SO_2^-$), and combinations thereof, wherein —$R^9$ has a net zero charge.

In an embodiment of the repeat unit of Formula 14, each —$X^1$— is —O—, and zwitterionic repeat units are derived from one or more (meth)acrylate monomers of general Formula 15:

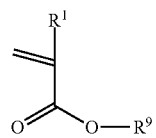

Formula 15 wherein $R^1$ and $R^9$ are defined as in Formula 14 above.

Exemplary zwitterionic monomers include sulfobetaine methacrylate (SBMA) and carboxybetaine methacrylate (CBMA):

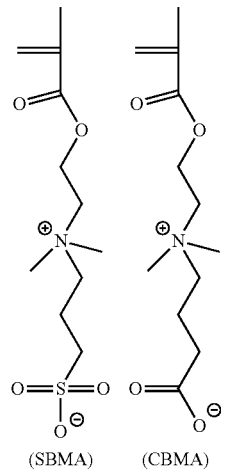

(SBMA)   (CBMA)

The crosslinkable polymer can optionally include repeat units derived from a hydrophobic vinyl polymerizable monomers in order to control the water-permeability and/or swell behavior of the selective layer. Non-limiting optional hydrophobic monomers include, for example, methyl methacrylate (MMA), methyl acrylate (MA), benzyl (meth)acrylate, cyclohexyl (meth)acrylate, 2-ethylhexyl(meth)acrylate, styrene, vinyl acetate, and combinations thereof.

Also contemplated are crosslinkable polymers generated from a (meth)acrylate or (meth)acrylamide monomer, which include two of the following functional groups: i) a nucleophilic amine group capable of reacting with an acid halide, ii) an ester or amide group comprising a poly(alkylene oxide) group, iii) an ester or amide group comprising a cationic group, and iv) an ester or amide group comprising a zwitterionic group. As one non-limiting example, the crosslinkable polymer can comprise a first repeat unit derived from a (meth)acrylate monomer, which comprises a side chain comprising i) a cationic group and ii) a nucleophilic amine group capable of interfacial reaction with the acid halide. The crosslinkable polymer can, for example, further comprise a second repeat unit derived from a (meth)acrylate monomer comprising a poly(alkylene oxide) chain segment. As another non-limiting example, the crosslinkable polymer can comprise repeat units derived from a (meth) acrylate monomer comprising a side chain poly(alkylene oxide) chain having a nucleophilic amine group capable of reacting with the acid halide.

The crosslinkable polyamide polymer can be prepared using various known methods and conditions for the polymerization of vinyl monomers, in particular (meth)acrylate monomers, including but not limited to solution polymerization, suspension polymerization, and emulsion polymerization. The monomers can be polymerized batch-wise to form a random copolymer, or sequentially to generate block copolymers. In particular, the crosslinkable polymer is formed by free radical polymerization, initiated by organic peroxides, azo compounds, persulfates, photoinitiators, and ionized radiation such as γ-rays. The polymerization is conducted at a temperature of 20° C. to 100° C., more particularly 40° C. to 90° C.

The crosslinkable polyamide polymer can comprise first repeat units comprising a nucleophilic amine group in an amount of about 5 wt. % to about 20 wt. % based on total weight of the monomers used to prepare the crosslinkable polymer. When present, repeat units comprising a poly (alkylene oxide) chain segment are present in an amount of about 30 wt. % to about 70 wt. % based on total weight of the monomers used to prepare the crosslinkable polymer. When present, repeat units comprising a cationic or zwitterionic group are present in an amount of about 55 wt. % to about 10 wt. % based on total weight of the monomers used to make the crosslinkable polymer. In a specific example, the crosslinkable polymer comprises a poly(methacrylate) copolymer of 2-aminoethyl methacrylate hydrochloride (AEMA-HCL) (corresponding to the first repeat units), poly(ethylene glycol) methyl ether methacrylate (MPEGMA), and sulfobetaine methacrylate (SBMA). The first repeat units derived from AEMA-HCL are present in an amount of about 5 wt. % to about 20 wt. %, repeat units derived from MPEGMA are present in an amount of about 30 wt. % to about 70 wt. %, and repeat units derived from SBMA are present in an amount of about 55 wt. % to about 10 wt. %, each based on total weight of monomers used to make the crosslinkable polymer. In an embodiment, the crosslinkable polymer comprises a polymethacrylate copolymer comprising first repeat units derived from AEMA-HCL in an amount of about 5 wt. % to about 15 wt. %, and second repeat units derived from MPEGMA in an amount of about 55 wt. % to about 70 wt. %, each based on the total weight of monomers used to make the crosslinkable polymer.

The crosslinkable polyamide polymer can include a repeat unit having a cationic side chain group, wherein the side chain has a net positive charge. These crosslinkable polymers have the general Formula 16:

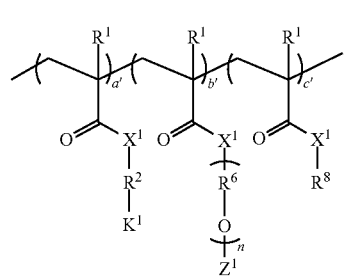

Formula 16 wherein, in Formula 16, a', b' and c' are positive numbers;

n is a positive integer greater than 1;

each —$R^1$ is independently a hydrogen or a methyl group;

—$R^2$— is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms;

—$K^1$ is a monovalent radical selected from the group consisting of —$NH_2$— and —N(H)($R^4$)—, wherein —$R^4$ is a monovalent radical comprising 1 to 50 carbon atoms;

—$R^6$— is a divalent radical selected from the group consisting of a ethylene, 2-propylene, butylene, and combinations thereof, —$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups, wherein —$R^7$ is a monovalent radical comprising 1 to 20 carbon atoms, and -$L^1$- is a divalent radical comprising 1 to 20 carbon atoms, and —$R^8$ is a cationic monovalent radical comprising a member selected from the group consisting of quaternary ammonium salts, sulfonium salts, phosphonium salts, or combination thereof, wherein —$R^8$— has a net positive charge.

In an embodiment of the polymer of Formula 16, —$X^1$— is —O—, —$R^6$— is ethylene, and —$R^8$ includes a quaternary ammonium group, wherein —$R^8$ has a net positive charge.

In Formula 16 the first repeat unit indicated by a' can be present in an amount of about 5 wt. % to about 20 wt. %, the second repeat unit indicated by b' can be present in an amount of about 40 wt. % to about 70 wt. %, and the third repeat unit indicated by c' can be present in an amount of about 55 wt. % to about 10 wt. %, each based on total weight of the crosslinkable polymer.

The crosslinkable polymer can include a repeat unit having a zwitterionic side chain group. These crosslinkable polymers have the general Formula 17:

Formula 17

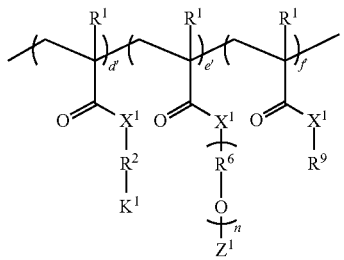

A thermoreversible crosslinkable polymer has the general Formula 18:

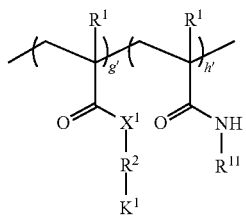

Formula 18 wherein, in Formula 17,
d', e' and f are positive numbers;
n is a positive integer greater than 1;
each —$R^1$ is independently a hydrogen or a methyl group;
—$R^2$— is a linear, branched or cyclic divalent radical selected from the group consisting of alkylenes, fluoroalkylenes, arylenes, arylalkylenes, alkylarylenes, and silicon containing groups;
—$X^1$— is a divalent radical selected from the group consisting of —O—, —N(H)—, and —N($R^5$)—, wherein —$R^5$ is a monovalent radical comprising 1 to 20 carbon atoms;
—$K^1$ is a monovalent radical selected from the group consisting of —$NH_2$— and —N(H)($R^4$)—, wherein —$R^4$ is a monovalent radical comprising 1 to 50 carbon atoms;
—$R^6$— is a divalent radical selected from the group consisting of ethylene, 2-propylene, butylene, and combinations thereof;
—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups, wherein —$R^7$ is a monovalent radical comprising 1 to 20 carbon atoms, and -$L^1$- is a divalent radical comprising 1 to 20 carbon atoms; and
—$R^9$ is a zwitterionic monovalent radical comprising i) a cationic group selected from the group consisting of quaternary ammonium groups, sulfonium groups, phosphonium groups, and combinations thereof, and ii) an anionic group selected from the group consisting of carboxylate (—$CO_2^-$), sulfonate (—$SO_3^-$), sulfinate (—$SO_2^-$), and combinations thereof, wherein —$R^9$ has a net zero charge.

In an embodiment of the polymer of Formula 17, —$X^1$— is —O—, —$R^6$— is ethylene, and —$R^9$— comprises a quaternary ammonium group and a sulfonate (—$SO_3^-$) group, and —$R^9$— has a net zero charge.

In formula (11) the first repeat unit indicated by d' can be present in an amount of about 5 wt. % to about 20 wt. %, the second repeat unit indicated by e' can be present in an amount of about 40 wt. % to about 70 wt. %, and the third repeat unit indicated by f' can be present in an amount of about 55 wt. % to about 10 wt. %, each based on total weight of the crosslinkable polymer.

In an embodiment, the multi-functional acid halide crosslinking agent is selected from the group consisting of

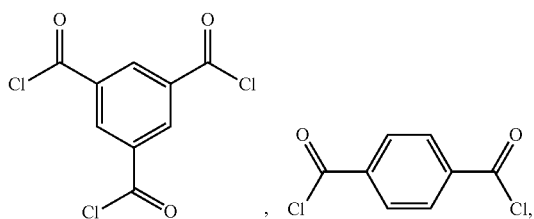 [SMILES: O=C(Cl)c1cc(C(=O)Cl)cc(C(=O)Cl)c1 ; O=C(Cl)c1ccc(C(=O)Cl)cc1]

and combinations thereof.

wherein, in Formula 18,
g' and h' are positive numbers;
each —$R^1$ is independently a hydrogen or a methyl group;
—$R^2$— is a linear, branched or cyclic divalent radical selected from the group consisting of alkylenes, fluoroalkylenes, arylenes, arylalkylenes, alkylarylenes, and silicon containing groups;
—$X^1$— is a divalent radical selected from the group consisting of —O—, —N(H)—, and —N($R^5$)—, wherein —$R^5$ is a monovalent radical comprising 1 to 20 carbon atoms;
—$K^1$ is a monovalent radical selected from the group consisting of —$NH_2$— and —N(H)($R^4$)—, wherein —$R^4$ is a monovalent radical comprising 1 to 50 carbon atoms; and
—$R^{11}$ is a monovalent hydrocarbon radical selected from the group consisting of methyl, ethyl, n-propyl, iso-propyl, cyclopropyl, n-butyl, sec-butyl, t-butyl, and combinations thereof.

In an embodiment of the polymer of Formula 18, —$X^1$— is —O—, and —$R^{11}$ is iso-propyl.

In Formula 18 the first repeat unit indicated by g' can be present in an amount of about 5 wt. % to about 20 wt. %, and the second repeat unit indicated by h' can be present in an amount of about 80 wt. % to about 90 wt. %, each based on total weight of the crosslinkable polymer.

More specifically, the crosslinkable polymer is a random copolymer including repeat units with side chain groups including an ammonium salt and a nucleophilic amine group capable of reacting interfacially with an acid halide group to form a crosslinked polymer. In a specific embodiment, the crosslinkable polymer is a random copolymer comprising repeat units derived from poly(ethylene glycol) methyl ether methacrylate, sulfobetaine methacrylate, and 2-aminoethyl methacrylate hydrochloride. In another specific embodiment, the crosslinkable polymer is a random copolymer comprising repeat units derived from poly(ethylene glycol) methyl ether methacrylate, 2-(N,N-dimethylamino)ethyl methacrylate methyl iodide, and 2-aminoethyl methacrylate hydrochloride. In another specific embodiment, the crosslinkable polymer is a random copolymer comprising repeat units derived from isopropyl acrylamide and 2-aminoethyl methacrylate hydrochloride.

The crosslinkable polymer can optionally comprise, in addition to the above described repeat units, repeat units derived from one or more additional polymerizable monomers. In these instances, the crosslinkable polymer can comprise more than 0 wt. % and less than about 10 wt. % of the additional repeat units based on total weight of the crosslinkable polymer. In an embodiment, the additional repeat units preferably account for no more than 10 wt. %, more preferably no more than 5 wt. %, and most preferably no more than 2 wt. % of the total weight of the crosslinkable polymer.

In general, the crosslinked polymer formed on the surface of the layer 22 by interfacial reaction Step 2 IP includes the following structure of Formula 19:

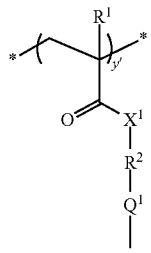

Formula 19 wherein, in Formula 19,

—$R^1$ is independently a hydrogen or a methyl group;

—$R^2$— is a linear, branched or cyclic divalent radical independently selected from the group consisting of alkylenes, fluoroalkylenes, arylenes, arylalkylenes, alkylarylenes, and silicon containing groups;

—$X^1$— is a divalent radical independently selected from the group consisting of —O—, —N(H)—, and —N($R^5$)—, wherein —$R^5$ is a monovalent radical comprising 1 to 20 carbon atoms;

y' is a positive number greater than or equal to 1; and

-$Q^1$- is a linking group chemically bound to the polyamide layer 22. Suitable non-limiting examples of the linking group $Q^1$ include N—H or N—$R^{10}$, wherein $R^{10}$ is an alkyl group.

The crosslinked polymer of Formula 19 can further optionally include one or more repeat units selected from the group consisting of i) repeat units comprising a poly(alkylene oxide) side chain segment, ii) repeat units comprising a side chain comprising a cationic group, the side chain having a net positive charge, iii) repeat units comprising a side chain comprising a zwitterionic group, the side chain having a net zero charge, and iv) repeat units comprising a an amide side chain, wherein a linear homopolymer of the repeat unit exhibits thermoreversible properties in water, and v) combinations thereof.

It should be understood that the starred bonds in Formula 19 and in other structures that follow indicate a point of attachment of an adjacent repeat unit or moiety, not a methyl or methylene group.

The crosslinked polymer formed by the interfacial reaction of the acid halide with the crosslinkable polymer of general Formula 19, which has cationic repeat units, has the general Formula 20:

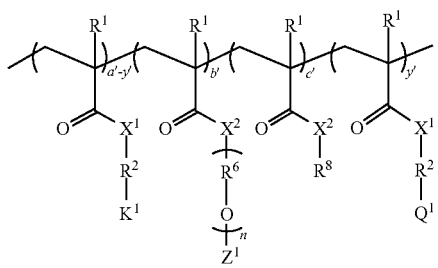

Formula 20 wherein, in Formula 20, each —$R^1$ is independently a hydrogen or a methyl group;

—$R^2$— is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms;

each —$X^2$— is a divalent radical independently selected from the group consisting of —O—, —N(H)—, and —N($R^5$)—, wherein —$R^5$ is a monovalent radical comprising 1 to 20 carbon atoms;

a', b', c', and y' are positive numbers;

n is a positive integer greater than 1;

—$K^1$ is a monovalent radical selected from the group consisting of —$NH_2$— and —N(H)($R^4$)—, wherein —$R^4$ is a monovalent radical comprising 1 to 50 carbon atoms;

—$R^6$— is a divalent radical selected from the group consisting of ethylene, 2-propylene, butylene, and combinations thereof;

—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups, wherein —$R^7$ is a monovalent hydrocarbon radical comprising 1 to 20 carbon atoms, and -$L^1$- is a divalent radical comprising 1 to 20 carbon atoms;

—$R^8$ is a cationic monovalent radical comprising a member selected from the group consisting of quaternary ammonium salts, sulfonium salts, phosphonium salts, and combination thereof, wherein —$R^8$ has a net positive charge; and -$Q^1$- is a linking group comprising N—H or N—$R^{10}$, wherein $R^{10}$ is an alkyl group, and wherein $Q^1$ is chemically bound to the polyamide layer 22.

In an embodiment of the crosslinked polymer of Formula 20, a'-y'=0, —$X^1$— is —O—, —$R^6$— is ethylene (—$CH_2CH_2$—), and —$R^8$ comprises a quaternary ammonium group, wherein —$R^8$— has a net positive charge.

The interfacial reaction of the acid halide and the crosslinkable polymer of general Formula 16, which has zwitterionic repeat units, produces a crosslinked polymer having the general Formula 21:

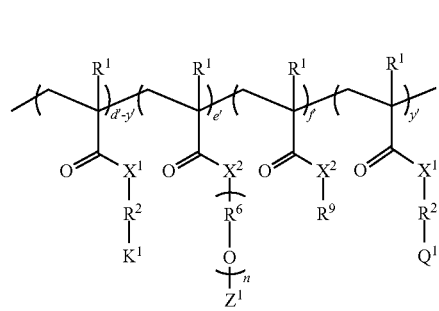

Formula 21 wherein, in Formula 21, each —$R^1$ is independently a hydrogen or a methyl group;

—$R^2$— is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms;

each —$X^2$— is a divalent radical independently selected from the group consisting of —O—, —N(H)—, and —N($R^5$)—, wherein —$R^5$ is a monovalent radical comprising 1 to 20 carbon atoms;

d', e', f, and y' are positive numbers;

n is a positive integer greater than 1;

—$K^1$ is a monovalent radical selected from the group consisting of —$NH_2$— and —NH($R^4$)—, wherein —$R^4$ is a monovalent radical comprising 1 to 50 carbon atoms;

—$R^6$— is a divalent radical selected from the group consisting of a ethylene, 2-propylene, butylene, and combinations thereof;

—$Z^1$ is a monovalent radical selected from the group consisting of —H, —$R^7$, -$L^1$-$NH_2$, -$L^1$-$NHR^7$, -$L^1$-$N(R^7)_2$, and hydrogen salt forms of any of the foregoing amine groups, wherein —$R^7$ is a monovalent radical comprising 1 to 20 carbon atoms, and -$L^1$- is a divalent radical comprising 1 to 20 carbon atoms;

—$R^9$ is a zwitterionic monovalent radical comprising i) a cationic group selected from the group consisting of quaternary ammonium groups, sulfonium groups, phosphonium groups, and combinations thereof, and ii) an anionic group selected from the group consisting of carboxylate (—$CO_2^-$), sulfonate (—$SO_3^-$), and sulfinate (—$SO_2^-$), wherein —$R^9$— has a net zero charge; and -$Q^1$- is a linking group comprising N—H or N—$R^{10}$, wherein $R^{10}$ is an alkyl group, and wherein $Q^1$ is chemically bound to the polyamide layer 22.

More particularly, n in Formulas 20-21 can be 5 to 15, even more particularly n can be 9 to 11. That is, the hydrophilic poly(alkylene oxide) side chain segment can have a degree of polymerization of 5 to 15 and, more particularly 9 to 11.

In an embodiment of the crosslinked polymer of Formula 21, —$X^1$— is —O—, —$R^6$— is ethylene, and —$R^9$ comprises i) a cationic group comprising a quaternary ammonium group, and ii) an anionic group comprising a sulfonate group (—$SO_3^-$), wherein —$R^9$— has a net zero charge.

In another embodiment of the crosslinked polymer of Formula 21, the side chain group represented by —C(=O)—$X^1$—$R^9$ is selected from the group consisting of:

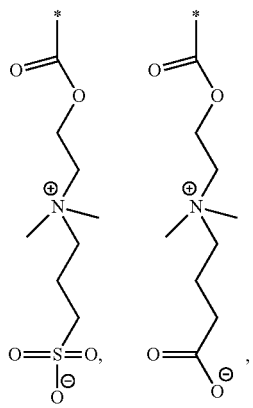

and combinations thereof

The interfacial reaction of the crosslinking agent with the crosslinkable polymer of general Formula 18, which has thermoreversible properties, produces a crosslinked polymer of general Formula 22:

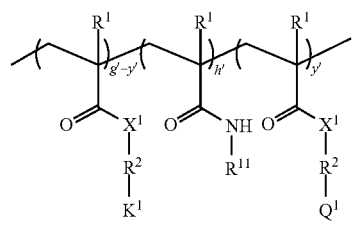

Formula 22 wherein, in Formula 22, each —$R^1$ is independently a hydrogen or a methyl group;

—$R^2$— is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms;

—$K^1$ is a monovalent radical selected from the group consisting of —$NH_2$— and —N(H)($R^4$)—, wherein —$R^4$ is a monovalent radical comprising 1 to 50 carbon atoms;

—$R^{11}$ is a monovalent hydrocarbon radical independently selected from the group consisting of methyl, ethyl, n-propyl, iso-propyl, cyclopropyl, n-butyl, sec-butyl, t-butyl, and combinations thereof;

g', h', and y' are positive numbers; and

-$Q^1$- is a linking group comprising N—H or N—$R^{10}$, wherein $R^{10}$ is an alkyl group, and wherein $Q^1$ is chemically bound to the polyamide layer 22.

In an embodiment of the crosslinked polymer of Formula 22, —$X^1$— is —O—, and —$R^{11}$ is iso-propyl.

More specifically, in some embodiments the crosslinked polymer is a material derived by interfacial reaction of i) a crosslinkable polymer including repeat units with side chain nucleophilic primary or secondary amine groups and an ammonium salt, and ii) an acid halide; wherein the crosslinkable polymer is selected from the group consisting of (i) a random copolymer including repeat units derived from poly(ethylene glycol) methyl ether methacrylate (MPEGMA), sulfobetaine methacrylate (SBMA), and 2-aminoethyl methacrylate hydrochloride (AEMA-HCL), (ii) a random copolymer including repeat units derived from poly(ethylene glycol) methyl ether methacrylate (MPEGMA), 2-dimethylaminoethyl methacrylate methyl iodide (DMAEMA-MI), and 2-aminoethyl methacrylate hydrochloride (AEMA-HCL), (iii) a random copolymer including repeat units derived from N-isopropyl acrylamide (NIPAM) and 2-aminoethyl methacrylate hydrochloride (AEMA-HCL), and (iv) combinations thereof.

The aqueous chemical mixture (C) in step 2 IP (FIG. 2) can optionally include an accelerator and an organic solvent, which is preferably a non-solvent for the crosslinkable polymer. The accelerator in mixture (C) can be selected from known catalysts suitable for promoting the interfacial crosslink reaction, including, for example, tertiary amine bases.

The chemical mixture (C) can include other additives, such as a surfactant and/or thickener for producing a uniform coating. The coating mixture can include additional additives to enhance physical and/or mechanical properties, including, for example, fillers, reinforcing agents, antistatic agents, and the like, such additional additives being readily determined by those of skill in the art without undue experimentation. Examples of fillers or reinforcing agents include glass fibers, clays, carbon fibers, silica, and talc. Examples of antistatic agents include glycerol monostearate, sodium stearyl sulfonate, and sodium dodecylbenzenesulfonate. Individual, as well as combinations of, the foregoing additives may be used. Such additives may be mixed at a suitable time during the mixing of the components for forming the composition.

The interfacial reaction in Step 2 IP is preferably performed at a pH of 7.0 or higher.

In an embodiment, the crosslinkable polymer has no repeat unit including a side chain alcohol group or a side chain thiol group capable of an interfacial reaction with the acid halide. The interfacial crosslink reaction involves the reaction of side chain amine groups with the acid halide. More specifically, the side chain amine groups are preferably primary amine groups.

In a specific embodiment, the crosslinkable polymer is derived from sulfobetaine methacrylate (SBMA), 2-aminoethyl methacrylate hydrochloride (AEMA-HCL), and poly(ethylene glycol) methyl ether methacrylate (MPEGMA), the support membrane is a polysulfone membrane for ultrafiltration, and the acid halide crosslinking agent is isophthaloyl chloride. In another specific embodiment, the crosslinkable polymer is derived from 2-dimethylaminoethyl methacrylate methyl iodide (DMAEMA-MI), 2-aminoethyl methacrylate hydrochloride (AEMA-HCL), and poly(ethylene glycol) methyl ether methacrylate (MPEGMA), the support membrane is a polysulfone membrane, and the acid halide crosslinking agent is isophthaloyl chloride. In another embodiment, the monomer mole ratio in each of the above crosslinkable polymers is respectively 3.7:1.0:5.3.

Although poly(ethylene oxide) graft copolymers, also known as poly(ethylene glycol) (PEG) graft copolymers, have been previously used for nanofiltration membranes, they are not crosslinked and hence adhesion to the support membrane is an issue when used for longer timescales.

The disclosed ultrathin protective layer 24 can be used in applications where high performance properties are required, such as improved anti-fouling efficiency, and adhesion to RO or NF membranes. The amine functional hydrophilic polymers and copolymers can be easily synthesized using free radical polymerization, and can then be linked with the polyamide, layer 22. The disclosed methods also allow for a wide range of performance properties by adjusting the structure and/or content of the monomers used to form the crosslinkable hydrophilic polymer.

Figure 3:
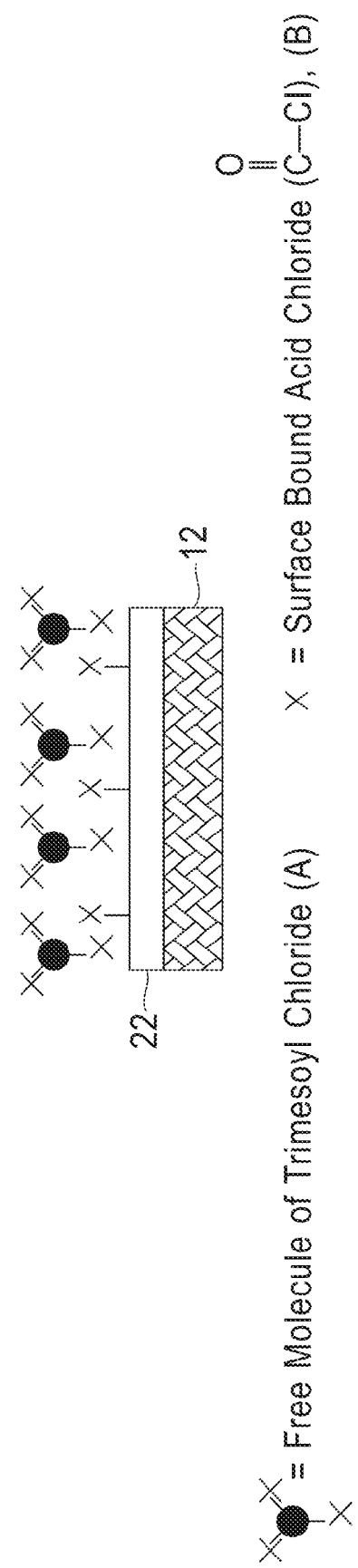
FIG. 3 is a schematic illustration showing two different kinds of acid-halides adjacent to or chemically bound to the surface of the crosslinked polyamide layer 22 in FIG. 1: (A) free acid halide molecules that are physically deposited on the surface of the layer 22; and (B) acid halides chemically bound to the surface of the layer 22.

To minimize the thickness of the crosslinked hydrophilic polymer layer 24 to form a monolayer, free acid halide molecules (A in FIG. 3), which are physically deposited (not chemically bound to the surface) on the surface of the crosslinked polyamide 22, can optionally be rinsed away using a suitable organic solvent after the completion of the first interfacial polymerization Step 1 IP. The crosslinkable polyamide polymers are then only reacted with acid halide groups bound to the surface-bound acid-halide groups (B in FIG. 3) during the second interfacial reaction process Step 2 IP, creating a single layer 24 of crosslinked polymer chains. Since the hydrophilic polymer chain 24 is bound to the polyamide active layer 22 at multiple points, the thickness of the layer 24 should be less than the length of a vertically stretched single polymer chain.

While the above describes an embodiment of a method for making the protective layer 24 on the layer 22, in other embodiments the protective layer 24 can be prepared as a self-supporting film.

The following non-limiting examples illustrate the practice of the invention.

EXAMPLES

Materials referenced in the following examples are listed in Table 2.

TABLE 2

| NAME | DESCRIPTION | SUPPLIER |
| --- | --- | --- |
| AEMA-HCl | 2-Aminoethyl Methacrylate Hydrochloride Salt | Aldrich |
| AMPA-2HCl | 2,2'-Azobis(2-Methylpropion-amidine) Dihydrochloride; initiator | Aldrich |
| DC193 | DC-193 Silicone Based Copolymer Surfactant | Dow Corning |
| DMAEMA-BB | 2-Dimethylaminoethyl Methacrylate•Butyl Bromide Salt | Aldrich |
| DMAEMA-MI | 2-Dimethylaminoethyl Methacrylate•Methyl Iodide Salt | Aldrich |
| MPEGMA | Poly(Ethylene Glycol) Methyl Ether Methacrylate (Mn = 475 G/Mol) | Aldrich |
| MPD | m-phenylene diamine | Aldrich |
| PSF | Polysulfone membrane, Model Number PS20 for ultrafiltration. Performance properties: water flux 900 (Lmh/bar), Marker = 20K dalton poly(ethylene glycol), % Marker Rejection = 95% at 30 psi/25° C./2000 ppm Marker | Sepro Membranes |
| SBMA | Sulfobetaine Methacrylate (N,N-dimethyl-N-methacryloxyethyl-N-(3-sulfopropyl)ammonium sulfobetaine) | Aldrich |
| TMC | trimesoyl chloride | Aldrich |

Example 1

Synthesis of Amine-Functional Anti-Fouling Polymer P-1

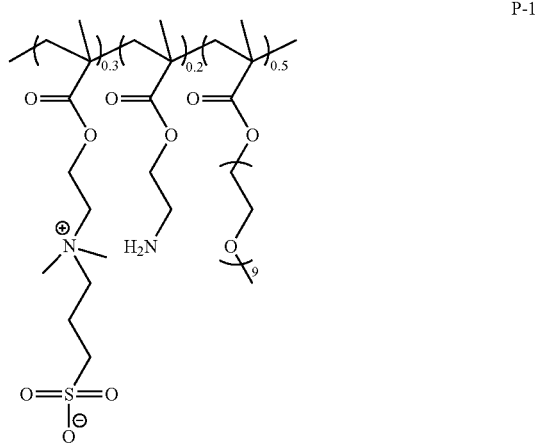

P-1

A water-soluble anti-fouling crosslinkable polymer, P-1, was synthesized by free-radical polymerization. To a 250-ml three neck round bottom flask equipped with a magnetic stir bar and a condenser, 1.44 g (8.72 mmol) of 2-aminoethyl methacrylate hydrochloride salt (AEMA-HCl), 3.65 g (13.08 mmol) of sulfobetaine methacrylate (SBMA), 9.90 g (21.8 mmol) of poly(ethylene glycol) methyl ether methacrylate (MPEGMA), Mn=475 g/mol (Mn=the number average molecular weight), 60 ml deionized water and 0.95 g (3.50 mmol) of 2,2 azobis(2-methypropion-amidine)dihydrochloride (AMPA-2HCl) were added.

The reaction mixture was stirred for 24 hours at 70° C. to obtain the hydrophilic random copolymer P-1 shown above. The reaction mixture was diluted with deionized water to obtain a 2 wt. % solution. The pH of the resulting polymer solution was about 5.6. A few drops of saturated potassium carbonate were added to the polymer solution such that the pH was about 9.0.

The resulting polymer solution was filtered through a filter paper and then used to fabricate a coating layer on UF membrane without further modification. The subscripts in the formula of P-1 indicate relative moles.

Example 2

Synthesis of Amine-Functional Anti-Fouling and Antimicrobial Polymer P-2

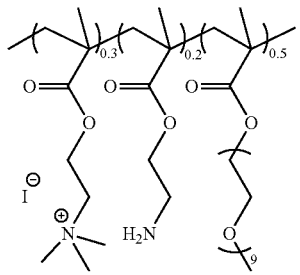

P-2

A water-soluble antifouling crosslinkable polymer, P-2, was synthesized by free-radical polymerization. To a 250-ml three neck round bottom flask equipped with a magnetic stir bar and a condenser, 1.44 g (8.72 mmol) of 2-aminoethyl methacrylate hydrochloride salt (AEMA-HCl), 3.91 g (13.08 mmol) of diethyl aminoethyl methacrylate methyl iodide salt (DMAEMA-MI), 9.90 g (21.80 mmol) of polyethylene glycol methyl ether methacrylate (MPEGMA), Mn=475, 60 ml deionized water and 0.95 g (3.95 mmol) of 2,2 azobis(2-methypropion-amidine)dihydrochloride (AMPA.2HCl) were added.

The reaction mixture was stirred for 24 hours at 70° C. to obtain the hydrophilic random copolymer P-2. The resulting reaction mixture was diluted in deionized water to obtain a 2 wt. % solution. The pH of the polymer solution was about 5.5. A few drops of saturated potassium carbonate were added to the polymer solution such that the pH was about 9.0.

The resulting polymer solution was filtered through a filter paper and then used to fabricate a coating layer on UF membrane without further modification. The subscripts in the formula of P-2 indicate relative moles.

Example 3

Synthesis of Amine-Functional Anti-Fouling and Antimicrobial Polymer P-3

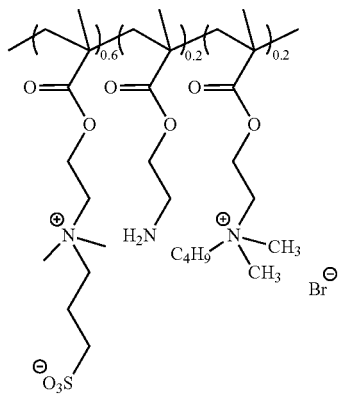

P-3

A water-soluble antifouling crosslinkable polymer, P-3, was synthesized by free-radical polymerization. To a 250-ml three neck round bottom flask equipped with a magnetic stir bar and a condenser, 1.44 g (8.72 mmol) of 2-aminoethyl methacrylate hydrochloride salt (AEMA-HCl), 2.56 g (8.72 mmol) of diethyl aminoethyl methacrylate butyl bromide salt (DMAEMA-BB), 7.30 g (26.16 mmol) of sulfobetaine methacrylate (SBMA), 70 ml deionized water and 0.708 g (2.61 mmol) of 2,2 azobis(2-methypropion-amidine)dihydrochloride (AMPA.2HCl) were added.

The reaction mixture was stirred for 24 hours at 70° C. to obtain the hydrophilic random copolymer P-2. The resulting reaction mixture was diluted in deionized water to obtain a 2 wt % solution. The pH of the polymer solution was about 5.5. A few drops of saturated potassium carbonate were added to the polymer solution such that the pH was about 9.0.

The resulting polymer solution was filtered through a filter paper and then used to fabricate a coating layer on UF membrane without further modification. The subscripts in the formula of P-3 indicate relative moles.

Example 4

Fabrication of Unmodified Polyamide RO Membranes, Ref-PA

An unmodified polyamide RO membrane, REF-PA, was synthesized on a pre-formed polysulfone (PSF) ultrafiltration membrane by single-step interfacial polymerization. The PSF membrane was placed in an aqueous solution of 2% (w/v) m-phenylene diamine (MPD) for 2 min, and the MPD soaked support membrane was then rolled with a rubber roller to remove excess solution.

The MPD saturated membrane was then immersed in a solution of 0.1% (w/v) trimesoyl chloride (TMC) in hexane. After 1 min of reaction, the resulting membrane was rinsed with an aqueous solution of 0.2% (w/v) sodium carbonate for 5 min and stored in pure water until the membrane is evaluated.

Example 5

Fabrication of Hydrophilic Polymer-Modified Polyamide RO Membranes (I)

An anti-fouling modification was performed on a preformed polysulfone (PSF) ultrafiltration membrane by sequential interfacial polymerization. The PSF membrane was placed in an aqueous solution of 2% (w/v) MPD for 2 min, and the MPD soaked support membrane was then rolled with a rubber roller to remove excess solution.

The MPD saturated membrane was then immersed in a solution of 0.1% (w/v) trimesoyl chloride (TMC) in hexane. After 1 min of reaction (the first interfacial polymerization Step 1 IP in FIG. 2), the resulting membrane was dried and placed in an aqueous basic solution of 2% (w/v) the hydrophilic polymers (P-1, P-2, or P-3) for 3 min (pH=ca. 9.0) (the second interfacial polymerization Step 2 IP in FIG. 2). The hydrophilic polymer-coated membrane was then rinsed with pure water and stored in pure water until the membrane is evaluated.

Example 6

Fabrication of Hydrophilic Polymer-Modified Polyamide RO Membranes (II) with Additional Rinsing Step The first interfacial polymerization step was performed in the same manner as described in Example 5. The polyamide membrane formed by the first interfacial polymerization step was then immersed into pure hexane for 5 min to rinse away unbound free trimesoly chloride compounds, and then the resulting membrane was dried and placed in an aqueous basic solution of 2% (w/v) of the hydrophilic polymers (P-1, P-2, or P-3) for 3 min (pH=ca. 9.0) (second interfacial polymerization Step 2 IP). The hydrophilic polymer-coated membrane was then rinsed with pure water and stored in pure water until the membrane is evaluated.

Example 7

Evaluation Method of Anti-Fouling Efficiency

Crossflow filtration of oil/water emulsion was carried out to monitor permeate flux of hydrophilic polymer-modified polyamide RO membranes and unmodified reference polyamide membrane by using crossflow filtration system.

An oil/water emulsion was prepared by blending n-Decane/surfactant (9:1) with 3 L of deionized water (concentration of emulsion: 150 ppm). The crossflow filtration was conducted at 25° C., and the crossflow rate was 1 Gal/min at 200 psi. Permeate flux was recorded by digital balances connected to a computer.

Example 8

Improved Anti-Fouling Efficiency of P-1 Modified Polyamide RO Membranes

Figure 4:
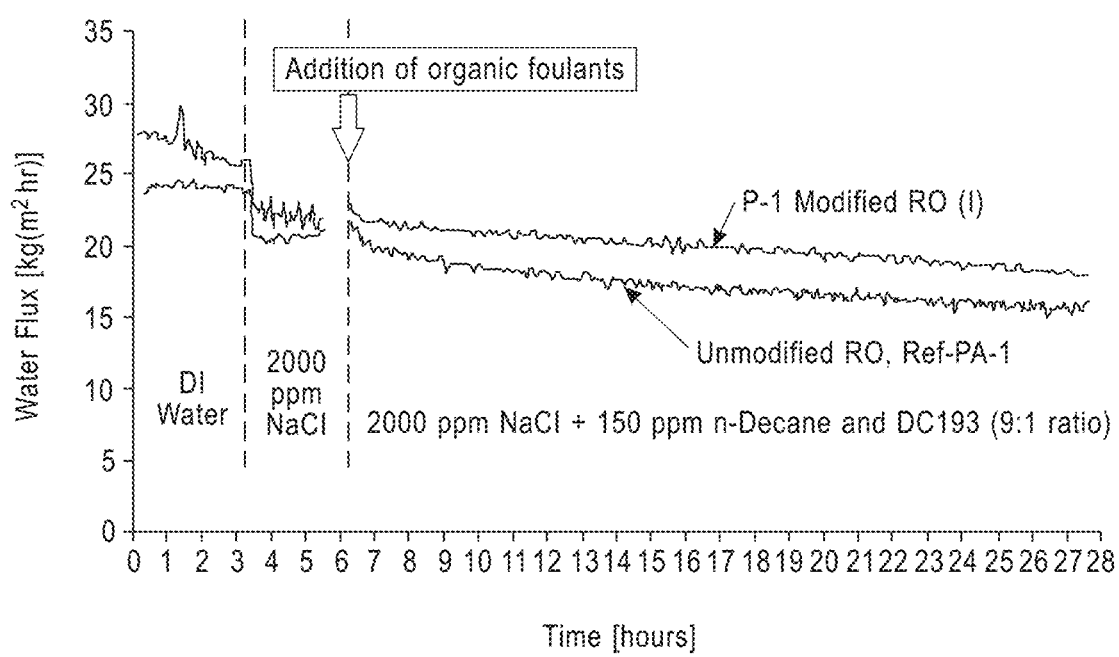
In FIGS. 4-8, various notations for polymers and membranes are used (see Examples below).

FIG. 4 presents the water permeate flux as a function of operation time. The pink curve shows the water flux profile of polyamide membrane modified with the hydrophilic polymer, P-1, through the method shown in Example 5 (P-1 modified RO (I)), and the blue curve shows the flux profile of an unmodified polyamide RO membrane (Ref-PA-1).

Before adding an oil-water emulsion into a feed tank, the water flux (pure water flux and salt water flux) of the Ref-PA-1 membrane was higher than the flux of the P-1 modified RO (I). However, the water flux was reversed after adding the oil-water emulsion. This result indicates that the hydrophilic polymer, P-1, effectively improves the oil-fouling resistance of a polyamide membrane.

Figure 5:
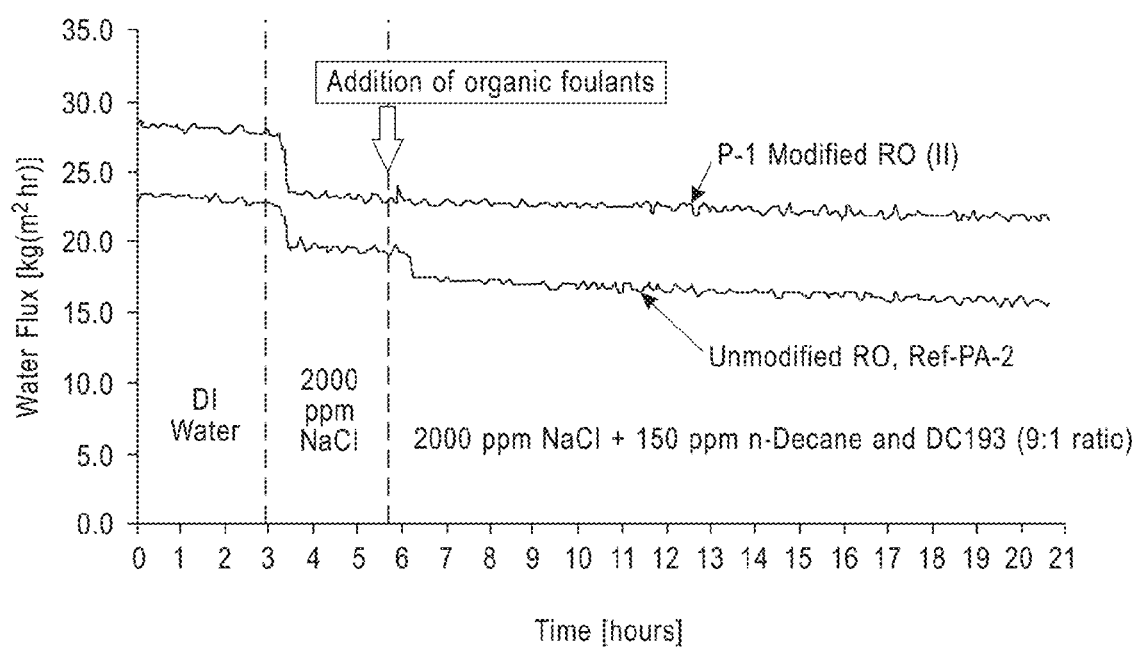

The absolute water flux of the P-1 modified RO membrane was further improved by employing the membrane fabrication method described in Example 6 (with an additional rinsing step). The blue curve in FIG. 5 presents the water flux profile of the modified RO membrane with the hydrophilic polymer, P-1, through the method shown in Example 6 (P-1 Modified RO (II)), and the black curve shows the flux profile of an unmodified polyamide RO membrane (Ref-PA-2).

Since an additional rinse was performed to remove unbound, free-molecules of trimesoyl chloride after the first interfacial polymerization reaction, the resulting hydrophilic coating was extremely thin, consequently, the P-1 modified RO (II) exhibited even higher pure water flux and salt water flux than Ref-PA-2. Furthermore, the water flux for the P-1 modified RO (II) was almost consistent, even after adding an oil-water emulsion, while the Ref-PA-2 showed significant flux drop.

Example 9

Improved Anti-Fouling Efficiency of P-2 Modified Polyamide RO Membranes

Figure 6:
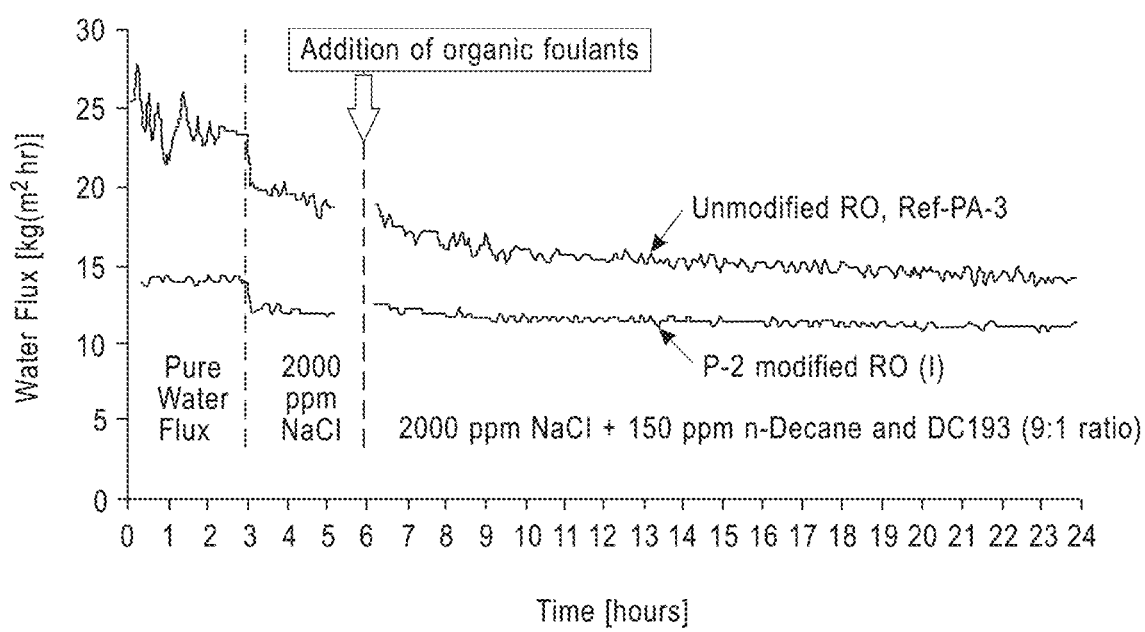

The orange curve in FIG. 6 shows the water flux profile of the polyamide membrane modified with the hydrophilic polymer, P-2, through the method shown in Example 5 (P-2 modified RO (I)), and the blue curve shows the flux profile of an unmodified polyamide RO membrane (Ref-PA-3).

Although the overall water flux of the P-2 modified RO (I) was lower than the flux of Ref-PA-3, there was no significant flux decline for the P-2 modified RO (I) after adding an oil-water emulsion, while gradual flux decline was observed for the Ref-PA-3. This result indicates the improved fouling resistance of the P-2 modified RO membrane.

Figure 7:
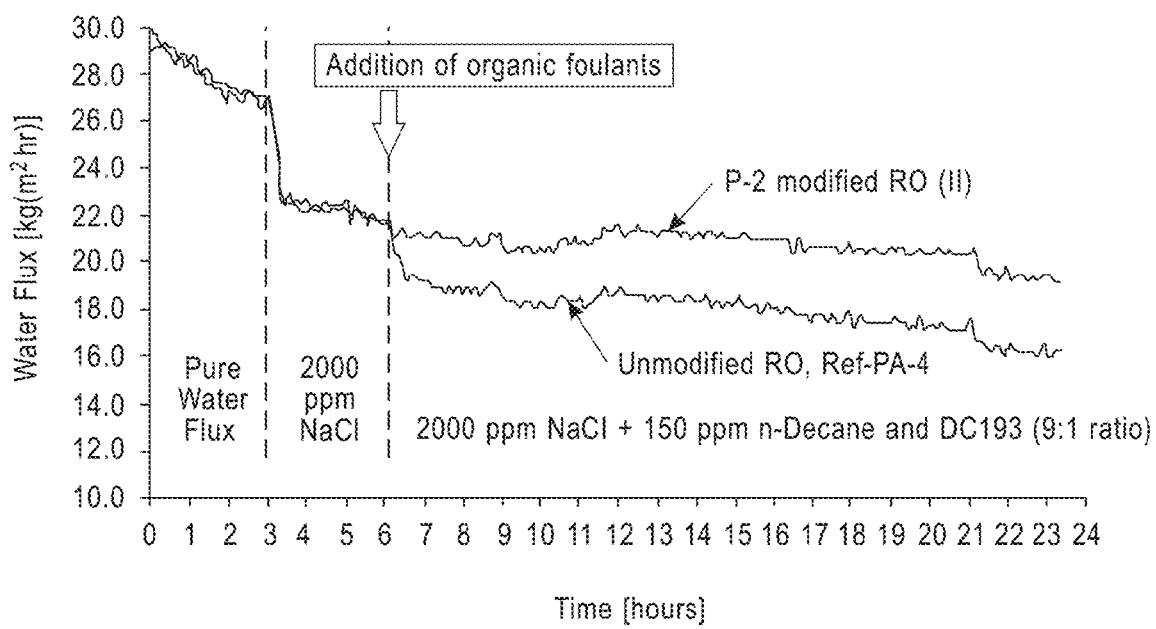

The membrane fabrication method described in Example 6 (with an additional rinsing step) was also effective to reduce the thickness of the P-2 coating layer and consequently to improve absolute water flux of the P-2 modified polyamide membrane. The red curve in FIG. 7 presents the water flux profile of the P-2 modified RO membrane, which is fabricated by the method shown in Example 6 (P-2 modified RO (II)), and the black curve shows the flux profile of an unmodified polyamide RO membrane (Ref-PA-4).

The pure water flux of P-2 modified RO (II) was consistent to that of Ref-PA-4, indicating that the P-2 coating is extremely thin. After adding an oil-water emulsion, the P-2 modified RO (II) showed higher water flux than Ref-PA-4, indicating outstanding oil-fouling resistance of the P-2 modified RO (II).

Example 10

Improved Anti-Fouling Efficiency of P-3 Modified Polyamide RO Membrane

Figure 8:
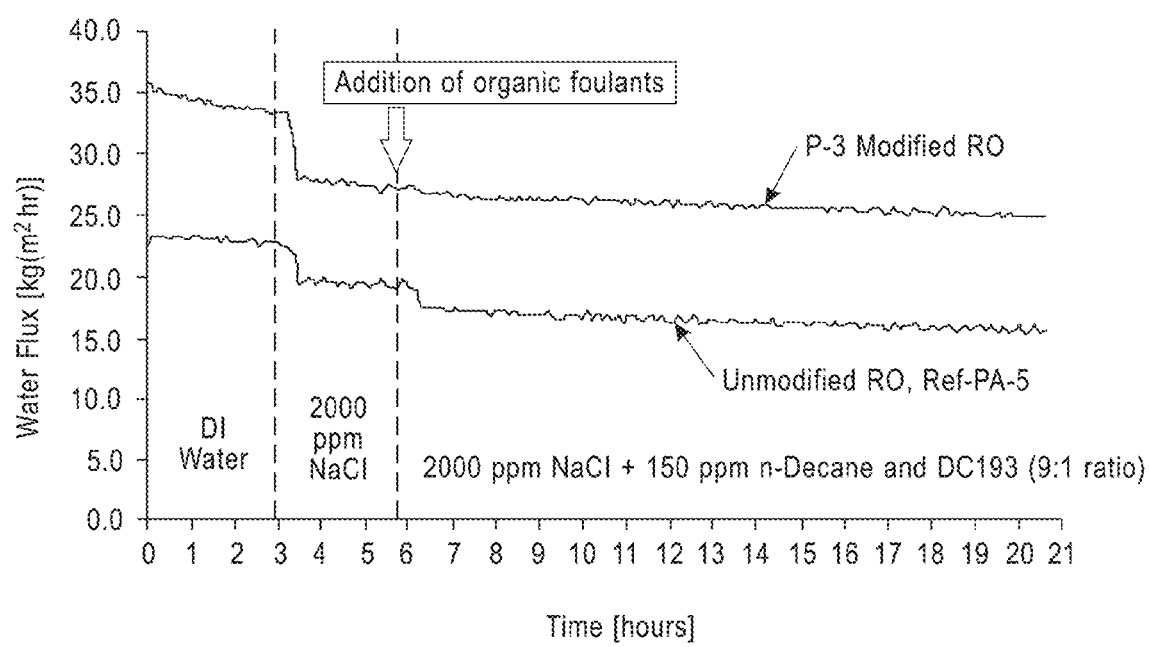

The red curve in FIG. 8 shows the water flux profile of the polyamide membrane modified with the hydrophilic polymer, P-3, through the method shown in Example 6 (P-3 modified RO), and the black curve shows the flux profile of an unmodified polyamide RO membrane (Ref-PA-5).

The pure water flux and salt water flux of the P-3 modified RO was even higher than the flux of Ref-PA-5. Furthermore, the water flux for the P-3 modified RO was quite consistent, even after adding an oil-water emulsion, while the Ref-PA-5 showed additional flux decline by oil-fouling.

Various embodiments of the invention have been described. These and other embodiments are within the scope of the following claims.

The invention claimed is:

1. A method of making a composite membrane, comprising:
   (i) applying a chemical mixture (A) to a support membrane to form a treated support membrane, wherein the chemical mixture (A) comprises an aqueous solution of a monomeric polyamine reactant represented by Formula 1:

 $R(NH_2)_z$    Formula 1 wherein R represents an organic group selected from aliphatic, alicyclic, aromatic, heterocyclic groups and combinations thereof, and z represents an integer of 2 or more;
   (ii) applying a chemical mixture (B) to the treated support membrane to form a first active layer on the support membrane, wherein the chemical mixture (B) comprises an organic solvent and a monomeric polyfunctional acyl halide reactant represented by Formula 2:

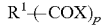 $R^1{-}(COX)_p$    Formula 2 wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more; and
   (iii) applying a chemical mixture (C) to the first active layer, wherein the chemical mixture (C) comprises a crosslinkable hydrophilic polymer with a backbone comprising repeat units selected from at least one of (meth)acrylate and (meth)acrylamide, and wherein at least one of the repeat units comprises a side chain comprising:
   an ammonium salt; and
   a nucleophilic amine group capable of interfacially reacting with an acid halide on or bonded to the first active layer to form a second active layer on the first active layer.

2. The method of claim 1, wherein the second active layer has a thickness greater than 0 nm and less than 20 nm.

3. The method of claim 1, wherein the crosslinkable polymer comprises one or more repeat units comprising a hydrophilic poly(alkylene) oxide side chain group.

4. The method of claim 1, further comprising:
   prior to step (iii), rinsing the first active layer with an organic solvent.

5. The method of claim 1, wherein the crosslinkable hydrophilic polymer is derived from sulfobetaine methacrylate, 2-aminoethyl methacrylate, and poly(ethylene glycol) methyl ether methacrylate.

6. The method of claim 1, wherein the crosslinkable hydrophilic polymer is derived from 2-dimethylaminoethyl methacrylate methyl iodide, 2-aminoethyl methacrylate, and poly(ethylene glycol) methyl ether methacrylate, and wherein the porous support membrane is a polysulfone membrane.

7. The method of claim 1, wherein the crosslinkable hydrophilic polymer has the following structure:

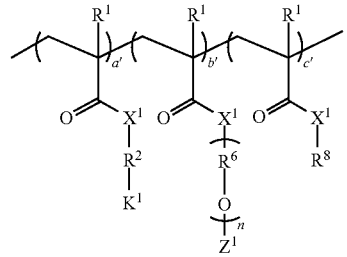

wherein,
a', b' and c' are positive numbers;
n is a positive integer greater than 1;
each $-R^1$ is independently a hydrogen or a methyl group;
$-R^2-$ is a linear, branched or cyclic divalent radical selected from the group consisting of alkylenes, fluoroalkylenes, arylenes, arylalkylenes, alkylarylenes, and silicon containing groups;
$-X^1-$ is a divalent radical selected from the group consisting of $-O-$, $-N(H)-$, and $-N(R^5)-$, wherein $-R^5$ is a monovalent radical comprising 1 to 20 carbon atoms;
$-K^1$ is a monovalent radical selected from the group consisting of $-NH_2-$ and $-N(H)(R^4)-$, wherein $-R^4$ is a monovalent radical comprising 1 to 50 carbon atoms;
$-R^6-$ is a divalent radical selected from the group consisting of ethylene, 2-propylene, butylene, and combinations thereof;
$-Z^1$ is a monovalent radical selected from the group consisting of $-H$, $-R^7$, $-L^1-NH_2$, $-L^1-N(H)(R^7)$, $-L^1-N(R^7)_2$, and hydrogen salt forms of any of the foregoing amine groups, wherein $-R^7$ is a monovalent radical comprising 1 to 20 carbon atoms, and $-L^1-$ is a divalent radical comprising 1 to 20 carbon atoms; and
$-R^8$ is a cationic monovalent radical comprising a member selected from the group consisting of quaternary ammonium salts, sulfonium salts, phosphonium salts, or combination thereof, wherein $-R^8-$ has a net positive charge.

8. The method of claim 7, wherein $-X^1-$ is $-O-$, $-R^6-$ is ethylene, and $-R^8$ comprises a quaternary ammonium group, wherein $-R^8$ has a net positive charge.

9. The method of claim 1, wherein the crosslinkable polymer has the following structure:

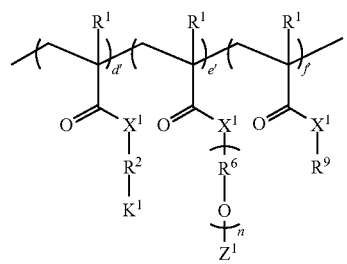

wherein,
d', e' and f' are positive numbers;
n is a positive integer greater than 1;
each $-R^1$ is independently a hydrogen or a methyl group;
$-R^2-$ is a linear, branched or cyclic divalent radical selected from the group consisting of alkylenes, fluoroalkylenes, arylenes, arylalkylenes, alkylarylenes, and silicon containing groups;

—$X^1$— is a divalent radical selected from the group consisting of —O—, —N(H)—, and —N($R^5$)—, wherein —$R^5$ is a monovalent radical comprising 1 to 20 carbon atoms;

—$K^1$ is a monovalent radical selected from the group consisting of —$NH_2$— and —N(H)($R^4$)—, wherein —$R^4$ is a monovalent radical comprising 1 to 50 carbon atoms;

—$R^6$— is a divalent radical selected from the group consisting of ethylene, 2-propylene, butylene, and combinations thereof;

—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups, wherein —$R^7$ is a monovalent radical comprising 1 to 20 carbon atoms, and -$L^1$- is a divalent radical comprising 1 to 20 carbon atoms; and —$R^9$ is a zwitterionic monovalent radical comprising i) a cationic group selected from the group consisting of quaternary ammonium groups, sulfonium groups, phosphonium groups, and combinations thereof, and ii) an anionic group selected from the group consisting of carboxylate (—$CO_2^-$), sulfonate (—$SO_3^-$), sulfinate (—$SO_2^-$), and combinations thereof, wherein —$R^9$— has a net zero charge.

10. The method of claim 9, wherein —$X^1$— is —O—, —$R^6$— is ethylene, and —$R^9$— comprises a quaternary ammonium group and a sulfonate group (—$SO_3^-$), and —$R^9$— has a net zero charge.

11. The method of claim 9, wherein the crosslinkable polymer is derived from 2-aminoethyl methacrylate hydrochloride (AEMA-HCl), poly(ethylene glycol) methyl ether methacrylate (MPEGMA), and sulfobetaine methacrylate (SBMA).

12. The method of claim 1, wherein the crosslinkable polymer exhibits thermoreversible properties in water, and has the following structure:

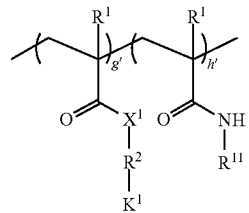

wherein,
g' and h' are positive numbers;
each —$R^1$ is independently a hydrogen or a methyl group;
—$R^2$— is a linear, branched or cyclic divalent radical selected from the group consisting of alkylenes, fluoroalkylenes, arylenes, arylalkylenes, alkylarylenes, and silicon containing groups;
—$X^1$— is a divalent radical selected from the group consisting of —O—, —N(H)—, and —N($R^5$)—, wherein —$R^5$ is a monovalent radical comprising 1 to 20 carbon atoms;
—$K^1$ is a monovalent radical selected from the group consisting of —$NH_2$— and —N(H)($R^4$)—, wherein —$R^4$ is a monovalent radical comprising 1 to 50 carbon atoms; and
—$R^{11}$ is a monovalent hydrocarbon radical selected from the group consisting of methyl, ethyl, n-propyl, isopropyl, cyclopropyl, n-butyl, sec-butyl, t-butyl, and combinations thereof.

13. The method of claim 12, wherein —$X^1$— is —O—, and —$R^{11}$ is isopropyl.

* * * * *